(12) United States Patent
Brody et al.

(10) Patent No.: US 11,148,091 B2
(45) Date of Patent: Oct. 19, 2021

(54) SELF-SUPPORTING STRUCTURES HAVING ACTIVE MATERIALS

(71) Applicant: ExxonMobil Upstream Research Company, Spring, TX (US)

(72) Inventors: John F. Brody, Bound Brook, NJ (US); Paul J. Tindall, Flemington, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/712,300

(22) Filed: Dec. 12, 2019

(65) Prior Publication Data

US 2020/0114299 A1 Apr. 16, 2020

Related U.S. Application Data

(62) Division of application No. 15/826,283, filed on Nov. 29, 2017, now Pat. No. 10,549,230.

(Continued)

(51) Int. Cl.
*B01D 53/02* (2006.01)
*B01D 53/047* (2006.01)
(Continued)

(52) U.S. Cl.
CPC ......... *B01D 53/0423* (2013.01); *B01D 53/02* (2013.01); *B01D 53/04* (2013.01); *B01D 53/0446* (2013.01); *B01D 53/261* (2013.01); *B01J 20/165* (2013.01); *B01J 20/18* (2013.01); *B01J 20/183* (2013.01); *B01J 20/20* (2013.01); *B01J 20/226* (2013.01); *B01J 20/2803* (2013.01); *B01J 20/28042* (2013.01); *B01J 20/28045* (2013.01); *B01J 20/3042* (2013.01); *B01J 20/3078* (2013.01); *B01J 20/3085* (2013.01); *B01J 20/3408* (2013.01);
(Continued)

(58) Field of Classification Search
None
See application file for complete search history.

(56) References Cited

U.S. PATENT DOCUMENTS

| 1,868,138 A | 7/1932 | Fisk |
| 3,103,425 A | 9/1963 | Meyer |

(Continued)

FOREIGN PATENT DOCUMENTS

| CN | 101371979 | 11/2010 |
| EP | 0257493 | 2/1988 |

(Continued)

OTHER PUBLICATIONS

U.S. Appl. No. 62/783,766, filed Dec. 21, 2019, Fulton et al.

(Continued)

*Primary Examiner* — Tam M Nguyen
(74) *Attorney, Agent, or Firm* — ExxonMobil Upstream Research Company—Law Department

(57) ABSTRACT

A method and system for manufacturing and using a self-supporting structure in processing unit for adsorption or catalytic processes. The self-supporting structure has greater than 50% by weight of the active material in the self-supporting structure to provide a foam-geometry structure providing access to the active material. The self-supporting structures, which may be disposed in a processing unit, may be used in swing adsorption processes and other processes to enhance the recovery of hydrocarbons.

14 Claims, 6 Drawing Sheets

Related U.S. Application Data

(60) Provisional application No. 62/437,319, filed on Dec. 21, 2016.

(51) Int. Cl.

| | | |
|---|---|---|
| *B01D 53/04* | (2006.01) | |
| *C10L 3/10* | (2006.01) | |
| *B01J 20/28* | (2006.01) | |
| *B01J 20/30* | (2006.01) | |
| *B01J 20/34* | (2006.01) | |
| *B01J 20/20* | (2006.01) | |
| *B01D 53/26* | (2006.01) | |
| *B01J 20/22* | (2006.01) | |
| *B01J 20/18* | (2006.01) | |
| *B01J 20/16* | (2006.01) | |

(52) U.S. Cl.
CPC ....... *B01J 20/3416* (2013.01); *B01J 20/3425* (2013.01); *B01J 20/3458* (2013.01); *C10L 3/104* (2013.01); *C10L 3/106* (2013.01); *B01D 2253/108* (2013.01); *B01D 2253/202* (2013.01); *B01D 2253/311* (2013.01); *B01D 2253/34* (2013.01); *B01D 2256/24* (2013.01); *B01D 2257/504* (2013.01); *B01D 2257/80* (2013.01); *B01D 2259/4062* (2013.01); *B01D 2259/40086* (2013.01); *C10L 2290/542* (2013.01); *Y02C 20/40* (2020.08)

(56) References Cited

U.S. PATENT DOCUMENTS

| | | | |
|---|---|---|---|
| 3,124,152 A | 3/1964 | Payne | |
| 3,142,547 A | 7/1964 | Marsh et al. | |
| 3,508,758 A | 4/1970 | Strub | |
| 3,594,983 A | 7/1971 | Yearout | |
| 3,602,247 A | 8/1971 | Bunn et al. | |
| 3,788,036 A | 1/1974 | Lee et al. | |
| 3,967,464 A | 7/1976 | Cormier et al. | |
| 4,187,092 A | 2/1980 | Woolley | |
| 4,261,815 A | 4/1981 | Kelland | |
| 4,324,565 A | 4/1982 | Benkmann | |
| 4,325,565 A | 4/1982 | Winchell | |
| 4,329,162 A | 5/1982 | Pitcher | |
| 4,340,398 A | 7/1982 | Doshi et al. | |
| 4,386,947 A | 6/1983 | Mizuno et al. | |
| 4,421,531 A | 12/1983 | Dalton, Jr. et al. | |
| 4,445,441 A | 5/1984 | Tanca | |
| 4,461,630 A | 7/1984 | Cassidy et al. | |
| 4,496,376 A | 1/1985 | Hradek | |
| 4,559,065 A | 12/1985 | Null et al. | |
| 4,631,073 A | 12/1986 | Null et al. | |
| 4,693,730 A | 9/1987 | Miller et al. | |
| 4,705,627 A | 11/1987 | Miwa et al. | |
| 4,711,968 A | 12/1987 | Oswald et al. | |
| 4,737,170 A | 4/1988 | Searle | |
| 4,770,676 A | 9/1988 | Sircar et al. | |
| 4,783,205 A | 11/1988 | Searle | |
| 4,784,672 A | 11/1988 | Sircar | |
| 4,790,272 A | 12/1988 | Woolenweber | |
| 4,814,146 A | 3/1989 | Brand et al. | |
| 4,816,039 A | 3/1989 | Krishnamurthy et al. | |
| 4,877,429 A | 10/1989 | Hunter | |
| 4,977,745 A | 12/1990 | Heichberger | |
| 5,110,328 A | 5/1992 | Yokota et al. | |
| 5,125,934 A | 6/1992 | Krishnamurthy et al. | |
| 5,169,006 A | 12/1992 | Stelzer | |
| 5,174,796 A | 12/1992 | Davis et al. | |
| 5,224,350 A | 7/1993 | Mehra | |
| 5,234,472 A | 8/1993 | Krishnamurthy et al. | |
| 5,292,990 A | 3/1994 | Kantner et al. | |
| 5,306,331 A | 4/1994 | Auvil et al. | |
| 5,354,346 A | 10/1994 | Kumar | |
| 5,365,011 A | 11/1994 | Ramachandran et al. | |
| 5,370,728 A | 12/1994 | LaSala et al. | |
| 5,486,227 A | 1/1996 | Kumar et al. | |
| 5,503,782 A | 4/1996 | Dyrud et al. | |
| 5,547,641 A | 8/1996 | Smith et al. | |
| 5,565,018 A | 10/1996 | Baksh et al. | |
| 5,647,891 A | 7/1997 | Blizzard et al. | |
| 5,669,962 A | 9/1997 | Dunne | |
| 5,672,196 A | 9/1997 | Acharya et al. | |
| 5,700,310 A | 12/1997 | Bowman et al. | |
| 5,733,451 A | 3/1998 | Coellner et al. | |
| 5,735,938 A | 4/1998 | Baksh et al. | |
| 5,750,026 A | 5/1998 | Gadkaree et al. | |
| 5,769,928 A | 6/1998 | Leavitt | |
| 5,779,768 A | 7/1998 | Anand et al. | |
| 5,792,239 A | 8/1998 | Reinhold, III et al. | |
| 5,807,423 A | 9/1998 | Lemcoff et al. | |
| 5,811,616 A | 9/1998 | Holub et al. | |
| 5,827,358 A | 10/1998 | Kulish et al. | |
| 5,827,577 A | 10/1998 | Spencer | |
| 5,882,380 A | 3/1999 | Sircar | |
| 5,906,673 A | 5/1999 | Reinhold, III et al. | |
| 5,908,480 A | 6/1999 | Ban et al. | |
| 5,912,426 A | 6/1999 | Smolarek et al. | |
| 5,914,294 A | 6/1999 | Park et al. | |
| 5,924,307 A | 7/1999 | Nenov | |
| 5,935,444 A | 8/1999 | Johnson et al. | |
| 5,951,744 A | 9/1999 | Rohrbach et al. | |
| 5,968,234 A | 10/1999 | Midgett, II et al. | |
| 5,976,221 A | 11/1999 | Bowman et al. | |
| 5,997,617 A | 12/1999 | Czabala et al. | |
| 6,007,606 A | 12/1999 | Baksh et al. | |
| 6,011,192 A | 1/2000 | Baker et al. | |
| 6,023,942 A | 2/2000 | Thomas et al. | |
| 6,053,966 A | 4/2000 | Moreau et al. | |
| 6,063,161 A | 5/2000 | Keefer et al. | |
| 6,096,115 A | 8/2000 | Kleinberg | |
| 6,099,621 A | 8/2000 | Ho | |
| 6,102,985 A | 8/2000 | Naheiri et al. | |
| 6,129,780 A | 10/2000 | Millet et al. | |
| 6,136,222 A | 10/2000 | Friesen et al. | |
| 6,147,126 A | 11/2000 | DeGeorge et al. | |
| 6,152,991 A | 11/2000 | Ackley | |
| 6,156,101 A | 12/2000 | Naheiri | |
| 6,171,371 B1 | 1/2001 | Derive et al. | |
| 6,176,897 B1 | 1/2001 | Keefer | |
| 6,179,900 B1 | 1/2001 | Behling et al. | |
| 6,183,538 B1 | 2/2001 | Naheiri | |
| 6,194,079 B1 | 2/2001 | Hekal | |
| 6,210,466 B1 | 4/2001 | Whysall et al. | |
| 6,231,302 B1 | 5/2001 | Bonardi | |
| 6,245,127 B1 | 6/2001 | Kane et al. | |
| 6,284,021 B1 | 9/2001 | Lu et al. | |
| 6,309,445 B1 | 10/2001 | Gittleman et al. | |
| 6,311,719 B1 | 11/2001 | Hill et al. | |
| 6,345,954 B1 | 2/2002 | Al-Himyary et al. | |
| 6,398,853 B1 | 6/2002 | Keefer et al. | |
| 6,402,813 B2 | 6/2002 | Monereau et al. | |
| 6,406,523 B1 | 6/2002 | Connor et al. | |
| 6,425,938 B1 | 7/2002 | Xu et al. | |
| 6,432,379 B1 | 8/2002 | Heung | |
| 6,436,171 B1 | 8/2002 | Wang et al. | |
| 6,444,012 B1 | 9/2002 | Dolan et al. | |
| 6,444,014 B1 | 9/2002 | Mullhaupt et al. | |
| 6,444,523 B1 | 9/2002 | Fan et al. | |
| 6,444,610 B1 | 9/2002 | Yamamoto | |
| 6,451,095 B1 | 9/2002 | Keefer et al. | |
| 6,457,485 B2 | 10/2002 | Hill et al. | |
| 6,458,187 B1 | 10/2002 | Fritz et al. | |
| 6,464,761 B1 | 10/2002 | Bugli | |
| 6,471,749 B1 | 10/2002 | Kawai et al. | |
| 6,471,939 B1 | 10/2002 | Boix et al. | |
| 6,488,747 B1 | 12/2002 | Keefer et al. | |
| 6,497,750 B2 | 12/2002 | Butwell et al. | |
| 6,500,234 B1 | 12/2002 | Ackley et al. | |
| 6,500,241 B2 | 12/2002 | Reddy | |
| 6,500,404 B1 | 12/2002 | Camblor Fernandez et al. | |
| 6,503,299 B2 | 1/2003 | Baksh et al. | |
| 6,506,351 B1 | 1/2003 | Jain et al. | |
| 6,514,318 B2 | 2/2003 | Keefer | |

(56) References Cited

U.S. PATENT DOCUMENTS

| | | |
|---|---|---|
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez Suarez |
| 6,660,064 B2 | 12/2003 | Golden et al. |
| 6,660,065 B2 | 12/2003 | Byrd et al. |
| 6,742,507 B2 | 1/2004 | Keefer et al. |
| 6,692,626 B2 | 2/2004 | Keefer et al. |
| 6,712,087 B2 | 3/2004 | Hill et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,936,561 B2 | 8/2005 | Marques et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,560,154 B2 | 7/2009 | Katoh |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |

(56) References Cited

U.S. PATENT DOCUMENTS

| | | |
|---|---|---|
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,753,428 B2 | 6/2014 | Lomax, Jr. et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,790,618 B2 | 7/2014 | Adams et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman et al. |
| 9,713,787 B2 | 7/2017 | Owens et al. |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0187029 A1 | 8/2007 | Axtell et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0236389 A1 | 10/2008 | Leedy et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0132548 A1 | 6/2010 | Dunne et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0149640 A1 | 6/2011 | Furuta et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma Canos et al. |
| 2012/0118755 A1 | 5/2012 | Dadvand et al. |
| 2012/0118758 A1 | 5/2012 | Ellis et al. |

(56) References Cited

U.S. PATENT DOCUMENTS

| | | |
|---|---|---|
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0227583 A1 | 9/2012 | Monereau et al. |
| 2012/0255377 A1 | 10/2012 | Kamakoti et al. |
| 2012/0272823 A1 | 11/2012 | Halder et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |
| 2013/0225898 A1 | 8/2013 | Sundaram et al. |
| 2013/0327216 A1 | 12/2013 | Deckman et al. |
| 2014/0013955 A1 | 1/2014 | Tammera et al. |
| 2014/0060326 A1 | 3/2014 | Sundaram |
| 2014/0157984 A1 | 6/2014 | Deckman et al. |
| 2014/0157986 A1 | 6/2014 | Ravikovitch et al. |
| 2014/0174291 A1 | 6/2014 | Gupta et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0010483 A1 | 4/2015 | Perry et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2015/0361102 A1 | 12/2015 | Inubushi et al. |
| 2016/0023155 A1 | 1/2016 | Ramkumar et al. |
| 2016/0129433 A1 | 5/2016 | Tammera et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0341011 A1 | 11/2017 | Nagavarapu et al. |
| 2017/0341012 A1 | 11/2017 | Nagavarapu et al. |
| 2018/0001301 A1 | 1/2018 | Brody et al. |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |
| 2019/0224613 A1 | 7/2019 | Nagavarapu et al. |
| 2019/0262764 A1 | 8/2019 | Johnson |
| 2019/0262765 A1 | 8/2019 | Barnes et al. |

FOREIGN PATENT DOCUMENTS

| | | |
|---|---|---|
| EP | 0426937 | 5/1991 |
| EP | 0904827 | 3/1999 |
| EP | 0953374 | 3/1999 |
| EP | 1110593 | 6/2001 |
| EP | 1674555 | 6/2006 |
| EP | 2754488 | 7/2014 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | H05-037318 U | 5/1993 |
| JP | H6-6736 U | 1/1994 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| JP | 2013-244469 A | 12/2013 |
| KR | 101349424 | 1/2014 |
| RU | 2329094 | 12/2006 |
| RU | 2547115 C2 | 4/2015 |
| WO | WO2002/024309 | 3/2002 |
| WO | WO2002/073728 | 9/2002 |
| WO | WO 03/04438 A2 | 1/2003 |
| WO | WO2005/090793 | 9/2005 |
| WO | WO2010/024643 | 3/2010 |
| WO | WO2011/139894 | 11/2011 |

OTHER PUBLICATIONS

Agrafiotis, C. et al., "The effect of particle size on the adhesion properties of oxide washcoats on cordierite honeycombs," Journal of Materials Science Letters, 1999, vol. 18, pp. 1421-1424.

Allen, M. P. et al., (1987) "Computer Simulation of Liquids" Clarendon Press, pp. 156-160.

Asgari, M. et al., (2014) "Designing a Commercial Scale Pressure Swing Adsorber for Hydrogen Purification" Petroleum & Coal, vol. 56(5), pp. 552-561.

Baerlocher, C. et al., (2017) International Zeolite Association's "Database of Zeolite Structures," available at http://www.iza-structure. org/2/databases/, downloaded Jun. 15, 2018, 1 page.

Burtch, N.C. et al., (2015) "Molecular-level Insight into Unusual Low Pressure CO2 Affinity in Pillared Metal-Organic Frameworks," J Am Chem Soc, 135, pp. 7172-7180.

Beauvais, C. et al., (2004) "Distribution of Sodium Cations in Faujasite-Type Zeolite: A Canonical Parallel Tempering Simulation Study," J Phys Chem B, 108, pp. 399-404.

Cheung, O. et al., (2013) "Adsorption kinetics for CO2 on highly selective zeolites NaKA and nano-NaKA,"Appl Energ, 112, pp. 1326-1336.

Cygan, R. T. et al., (2004) "Molecular Models of Hydroxide, Oxyhydroxide, and Clay Phases and the Development of a General Force Field", J Phys Chem B, vol. 108, pp. 1255-1266.

Deem, M. W. et al., (2009) "Computational Discovery of New Zeolite-Like Materials", J Phys Chem C, 113, pp. 21353-21360.

Demiralp, E., et al., (1999) "Morse Stretch Potential Charge Equilibrium Force Field for Ceramics: Application to the Quartz-Stishovite Phase Transition and to Silica Glass", Physical Review Letters, vol. 82(8), pp. 1708-1711.

Dubbeldam, D., et al., (2013) "On the inner workings of Monte Carlo codes" Molecular Simulation, vol. 39, Nos. 14-15, pp. 1253-1292.

Dubbeldam, D. et al. (2016) "RASPA: molecular simulation software for adsorption and diffusion in flexible nanoporous materials" Molecular Simulation, (published online Feb. 26, 2015), vol. 42(2), pp. 81-101.

Earl, D. J. et al., (2005) "Parallel tempering: Theory, applications, and new perspectives," Phys Chem Chem Phys, vol. 7, pp. 3910-3916.

ExxonMobil Research and Engineering and QuestAir (2008) "A New Commercialized Process for Lower Cost H2 Recovery—Rapid Cycle Pressure Swing Adsorption (RCPSA)," Brochure, 4 pgs.

Fang, H., et al., (2012) "Prediction of CO2 Adsorption Properties in Zeolites Using Force Fields Derived from Periodic Dispersion-Corrected DFT Calculations," J Phys Chem C, 116, ACS Publications, pp. 10692-10701.

Fang, H. et al., (2013) "First principles derived, transferable force fields for CO2 adsorption in Na-exchanged cationic zeolites," Phys Chem Chem Phys, vol. 15, pp. 12882-12894.

Fang, H. et al. (2014) "Recent Developments in First-Principles Force Fields for Molecules in Nanoporous Materials", Journal of Materials Chemistry A, 2014, vol. 2, pp. 274-291.

Fang, H. et al. (2016) "Identification of High-$CO_2$-Capacity Cationic Zeolites by Accurate Computational Screening", American Chemical Society, Chemistry of Materials, 2016, vol. 28, pp. 3887-3896.

(56) References Cited

OTHER PUBLICATIONS

Farooq, S. et al. (1990) "Continuous Countercurrent Flow Model for a Bulk PSA Separation Process," *AIChE J.*, v36 (2) p. 310-314.
FlowServe (2005) "Exceeding Expectations, US Navy Cuts Maintenance Costs With Flowserve GX-200 Non-Contacting Seal Retrofits," *Face-to-Face*, v17.1, 8 pgs.
Foster, M.D., et al. (2006) "A geometric solution to the largest-free-sphere problem in zeolite frameworks", *Microporous and Mesoporous Materials*, vol. 90, pp. 32-38.
Frenkel, D. et al., (2002) "Understanding Molecular Simulation: From Algorithms to Applications", 2nd ed., *Academic Press*, pp. 292-301.
Garcia, E. J., et al. (2014) "Tuning the Adsorption Properties of Zeolites as Adsorbents for CO2 Separation: Best Compromise between the Working Capacity and Selectivity", *Ind. Eng. Chem Res.*, vol. 53, pp. 9860-9874.
Garcia-Sanchez, a., et al. (2009) "Transferable Force Field for Carbon Dioxide Adsorption in Zeolites", J. Phys. Chem. C 2009, vol. 113, pp. 8814-8820.
GE Oil & Gas (2007) "Dry Gas Seal Retrofit," Florence, Italy, www.ge.com/oilandgas, 3 pgs.
Harris, J. G. et al., (1995) "Carbon Dioxide's Liquid—Vapor Coexistence Curve and Critical Properties as Predicted by a Simple Molecular Model", *J Phys Chem*, vol. 99, pp. 12021-12024.
Hill, J. R. et al., (1995) "Molecular Mechanics Potential for Silica and Zeolite Catalysts Based on ab Initio Calculations. 2. Aluminosilicates", *J Phys Chem*, vol. 99, pp. 9536-9550.
Hopper, B. et al. (2008) "World's First 10,000 psi Sour Gas Injection Compressor," *Proceedings of the 37th Turbomachinery Symposium*, pp. 73-95.
Jain, S., et al. (2003) "Heuristic design of pressure swing adsorption: a preliminary study", *Separation and Purification Technology*, vol. 33, pp. 25-43.
Jaramillo, E. et al. (2004) "Adsorption of Small Molecules in LTA Zeolites. 1. $NH_3$, $CO_2$, and $H_2O$ in Zeolite 4A", J. Phys. Chem. B 2004, vol. 108, pp. 20155-20159..
Kamakoti, P. (2015) "Modeling Adsorption in Cationic Zeolites—Trials and Tribulations", GRC Talk, 31 pgs.
Kim J. et al. (2012) "Predicting Large CO2 Adsorption in Aluminosilicate Zeolites for Postcombustion Carbon Dioxide Capture", *J. Am. Chem, Soc.*, vol. 134, pp. 18940-18940.
Kärger, J., et al. (2012) "Diffusion in Nanoporous Materials", Whiley-VCH publisher, vol. 1, Chapter 16, pp. 483-501.
Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.
Lin, L., et al. (2012) "In silico screening of carbon-capture materials", *Nature Materials*, vol. 1, pp. 633-641.
Liu, Q. et al., (2010) "NaKA sorbents with high $CO_2$-over-$N_2$ selectivity and high capacity to adsorb $CO_2$," *Chem Commun.*, vol. 46, pp. 4502-4504.
Loewenstein, W., (1954) "The Distribution of Aluminum in the Tetra-Hedra of Silicates and Aluminates" Am Mineral, 92-96.
Maurin et al. (2005) "Adsorption Mechanism of Carbon Dioxide in Faujasites: Grand Canonical Monte Carlo Simulations and Microcalorimetry Measurements", J. Phys. Chem. B 2005, vol. 109, pp. 16084-16091.
Neimark, A. V. et al., (1997) "Calibration of Pore vol. In Adsorption Experiments and Theoretical Models", *Langmuir*, vol. 13, pp. 5148-5160.
Palomino, M., et al. (2009) "New Insights on CO2-Methane Separation Using LTA Zeolites with Different Si/Al Ratios and a First Comparison with MOFs", Langmar, vol. 26(3), pp. 1910-1917.
Patcas, F.C. et al. (2007) "CO Oxidation Over Structured Carriers: A Comparison of Ceramic Forms, Honeycombs and Beads", *Chem Engineering Science*, v. 62, pp. 3984-3990.
Peng, D. Y., et al., (1976) "A New Two-Constant Equation of State", *Ind Eng Chem Fundam*, vol. 15, pp. 59-64.
Pham, T. D. et al., (2013) "Carbon Dioxide and Nitrogen Adsorption on Cation-Exchanged SSZ-13 Zeolites", Langmuir, vol. 29, pp. 832-839.
Pophale, R., et al., (2011) "A database of new zeolite-like materials", *Phys Chem Chem Phys*, vol. 13(27), pp. 12407-12412.
Potoff, J. J. et al., (2001) "Vapor-Liquid Equilibria of Mixtures Containing Alkanes, Carbon Dioxide, and Nitrogen", AIChE J, vol. 47(7), pp. 1676-1682.
Rameshni, Mahin "Strategies for Sour Gas Field Developments," *Worley Parsons-Brochure*, 20 pp.
Reyes, S. C. et al. (1997) "Frequency Modulation Methods for Diffusion and Adsorption Measurements in Porous Solids," *J. Phys. Chem. B.* v101, pp. 614-622.
Rezaei, F. et al. (2009) "Optimum Structured Adsorbents for Gas Separation Process", *Chem. Engineering Science*, v. 64, pp. 5182-5191.
Richardson, J.T. et al. (2000) "Properties of Ceramic Foam Catalyst Supports: Pressure Dop", *Applied Catalysis A: General* v. 204, pp. 19-32.
Robinson, D. B., et al., (1985) "The development of the Peng-Robinson Equation and its Application to Phase Equilibrium in a System Containing Methanol," *Fluid Phase Equilibria*, vol. 24, pp. 25-41.
Ruthven, D. M. et al. (1996) "Performance of a Parallel Passage Adsorbent Contactor," *Gas. Sep. Purif*, vol. 10, No. 1, pp. 63-73.
Stahley, J. S. (2003) "Design, Operation, and Maintenance Considerations for Improved Dry Gas Seal Reliability in Centrifugal Compressors," *Dresser-Rand, Tech. Paper 134*, 15 pages.
Santos, M. S (2011) "New Cycle configuration to enhance performance of kinetic PSA processes" Chemical Engineering Science 66, pp. 1590-1599.
Snurr, R. Q. et al., (1993) "Prediction of Adsorption of Aromatic Hydrocarbons in Silicalite from Grand Canonical Monte Carlo Simulations with Biased Insertions", *J Phys Chem*, vol. 97, pp. 13742-13752.
Stemmet, C.P. et al. (2006) "Solid Foam Packings for Multiphase Reactors: Modelling of Liquid Holdup and Mass Transfer", *Chem. Engineering Research and Design*, v. 84(A12), pp. 1134-1141.
Suzuki, M. (1985) "Continuous-Countercurrent-Flow Approximation for Dynamic Steady State Profile of Pressure Swing Adsorption" *AIChE Symp. Ser.* v81 (242) pp. 67-73.
Talu, O. et al., (2001), "Reference potentials for adsorption of helium, argon, methane, and krypton in high-silica zeolites," *Colloids and Surfaces A: Physicochemical and Engineering Aspects*, vol. 83-93, pp. 83-93.
Walton, K. S. et al., (2006) "CO2 adsorption in Y and X zeolites modified by alkali metal cation exchange," *Microporous and Mesoporous Mat*, vol. 91, pp. 78-84.
Willems, T. F. et al., (2012) "Algorithms and tools for high-throughput geometry-based analysis of crystalline porous materials" *Microporous Mesoporous Mat*, vol. 149, pp. 134-141.
Zukal, A., et al., (2009) "Isosteric heats of adsorption of carbon dioxide on zeolite MCM-22 modified by alkali metal cations", *Adsorption*, vol. 15, pp. 264-270.

SELF-SUPPORTING STRUCTURES HAVING ACTIVE MATERIALS

This application is a divisional of and claims priority to U.S. patent application Ser. No. 15/826,283 filed Nov. 29, 2017, now U.S. Pat. No. 10,549,230, which claims the priority benefit of U.S. Patent Application No. 62/437,319 filed Dec. 21, 2016 entitled "SELF-SUPPORTING STRUCTURES HAVING ACTIVE MATERIALS", the entirety of which is incorporated by reference herein.

This application is related to U.S. Provisional Patent Application No. 62/437,327 entitled "SELF-SUPPORTING STRUCTURES HAVING ACTIVE MATERIALS," and U.S. Patent Application No. 62/585,574 filed Nov. 14, 2017 entitled "SELF-SUPPORTING STRUCTURES HAVING ACTIVE MATERIALS," both having common inventors and assignee, the disclosure of which is incorporated by reference herein in its entirety.

FIELD

The present techniques relate to fabrication of self-supporting structures being foam-geometry structures including an active material. In particular, the self-supporting structures may be used in separation and/or catalysis processes, such as swing adsorption processes and other processes to enhance the recovery of hydrocarbons.

BACKGROUND

Processing techniques are useful in many industries and can typically be accomplished by flowing a mixture of fluids over an active material, such as a catalyst or adsorbent material, to provide the preferred product stream. For adsorption process, the adsorbent materials preferentially adsorbs one or more gas components, while not adsorbing one or more other gas components. The non-adsorbed components are recovered as a separate product. For catalytic processes, the catalyst is configured to interact with the components in the stream to increase the rate of a chemical reaction.

By way of example, one particular type of gas separation technology is swing adsorption, such as temperature swing adsorption (TSA), pressure swing adsorption (PSA), partial pressure purge swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an active material, such as an adsorbent material, when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated in a PSA process, for example, by reducing the pressure, thereby releasing the adsorbed carbon dioxide. The adsorbent material is then typically purged and repressurized. Then, the adsorbent material is ready for another adsorption cycle.

Typically, the structures used in catalytic processes and adsorption processes have a limited array of physical structure types. The active material are often structured into beads, granules, spheres or pellets using binders and processing techniques like extrusion or spray drying. The beads, granules, spheres or pellets are then packed together within a unit as a packed bed for the catalytic or adsorption processes. As a result, the conventional fabrication of catalysts or adsorbents, involve extrusions of small sphere-like active materials to be used in packed beds (e.g., spheres, pellets, lobes, etc.). However, the packed beds provide tortuous paths through the packed bed, which result in large pressure drops.

In other configurations, the structure may be an engineered structure, such as a monolith. In engineered structures, the active materials are coated onto substrates, such as a metal or ceramic monolith. The engineered structures provide substantially uniform flow paths, which lessen pressure drops as compared to packed beds. However, with these structures the majority of weight is inactive material that is used to form the underlying support structure.

As a result, typical fabrication approaches of structures involve extrusions of small sphere-like active materials to be used in packed beds (e.g., spheres, pellets, lobes, etc.), or the application of thin coatings of active material on monolith substrates (e.g., ceramic or metal monoliths). The packed beds have large pressure drops as compared with engineered structures. Also, the engineered structures include additional weight from structural support that is inactive material, which increases the size and weight of the structure.

Other related materials include Rezaei, F. et al., 2009, *Optimum structured adsorbents for gas separation processes*, Chemical Engineering Science 64, p. 5182 to 5191; Patcas, F. C. et al., 2007, *CO oxidation over structured carriers: A comparison of ceramic foams, honeycombs and beads*, Chemical Engineering Science 62, p. 3984 to 3990; U.S. Patent Application Publication No. 20030145726; and Richardson, J. T. et al., 2000, *Properties of ceramic foam catalyst supports: pressure drop*, Applied Catalysis A: General 204, p. 19 to 32; and Stemmet, C. P. et al., 2006, *Solid Foam Packings for Multiphase Reactors: Modelling of Liquid Holdup and Mass Transfer*, Chemical Engineering Research and Design 84(A12), p 1134 to 1141.

Accordingly, there remains a need in the industry for apparatus, methods, and systems that provide enhancements in processes having self-supporting structures that include active materials and may include forming foam-geometry structures having complex geometries. Further, the present techniques provide enhancements by integrating self-supporting foam-geometry structures with adsorption or catalytic processes, such as swing adsorption processes to separate contaminants from a feed stream. Accordingly, the present techniques overcome the drawbacks of conventional structures in separation and/or catalysis processes.

SUMMARY OF THE INVENTION

In one embodiment, a processing unit is described. The processing unit includes a housing forming an interior region; a self-supporting structure disposed within the interior region, wherein the self-supporting structure has greater than 50% by weight of the active material in the self-supporting structure, wherein the self-supporting structure is a foam-geometry structure configured to provide one or more tortuous channels for fluid flow paths through the self-supporting structure; and a plurality of valves secured to the housing, wherein each of the plurality of valves is configured to control fluid flow along a flow path extending between the self-supporting structure and a location external to the housing.

In one or more embodiment, the processing unit may include various enhancements. For example, the processing unit may include two or more of the plurality of valves are operated via common actuation mechanism; the processing unit may be a cyclical swing adsorbent bed unit configured to remove contaminants from a gaseous feed stream that passes through the self-supporting structure; the self-supporting structure may have greater than 60% by weight of the active material in the self-supporting structure or the self-supporting structure may have greater than 70% by weight of the active material in the self-supporting structure; may include a flow distributor disposed between the adsorbent bed and the plurality of valves; the housing may be configured to maintain a pressure from 5 pounds per square inch absolute (psia) and 1,400 psia; wherein the self-supporting structure has pores in the range between 10 pores per inch and 100 pores per inch, pores in the range between 15 pores per inch and 60 pores per inch; or pores in the range between 20 pores per inch and 40 pores per inch; wherein the self-supporting structure comprises a plurality of first sheets having a first composition and a first pore density and a plurality of second sheets having a second composition and second pore density, wherein the first pore density is in the range from 1 pores per linear inch (ppi) to 20 ppi and the second pore density is in the range from 20 ppi to 100 ppi and/or the self-supporting structure has a low thermal mass.

In yet another embodiment, a method for removing contaminants from a feed stream is described. The method comprises: a) performing one or more adsorption steps in an adsorbent bed unit, wherein each of the one or more adsorption steps comprise: passing a gaseous feed stream through the self-supporting structure disposed in an interior region of a housing of the adsorbent bed unit to remove one or more contaminants from the gaseous feed stream, wherein the self-supporting structure has greater than 50% by weight of the active material in the self-supporting structure, wherein the self-supporting structure is a foam-geometry structure configured to provide one or more tortuous channels for fluid flow paths through the self-supporting structure; b) performing one or more regeneration steps, wherein each of the one or more regeneration steps comprise conducting away at least a portion of the one or more contaminants in a contaminant output stream; and c) repeating the steps a) to b) for at least one additional cycle.

Further, in one or more embodiment, the method for removing contaminants from a feed stream may include various enhancements. For example, the method may be a swing adsorption method and the cycle duration may be for a period greater than 1 second and less than 600 seconds or a period greater than 1 second and less than 300 seconds; wherein the performing one or more regeneration steps comprises performing one or more purge steps, wherein each of the one or more purge steps comprise passing a purge stream through the self-supporting structure to conduct away at least a portion of the one or more contaminants in the contaminant output stream; wherein the gaseous feed stream may be a hydrocarbon containing stream having greater than one volume percent hydrocarbons based on the total volume of the gaseous feed stream; wherein a feed pressure of the gaseous feed stream may be in the range between 400 pounds per square inch absolute (psia) and 1,400 psia; wherein performing the one or more adsorption steps may be configured to lower the carbon dioxide ($CO_2$) level to less than 50 parts per million volume; wherein performing the one or more adsorption steps may be configured to lower the water ($H_2O$) level to less than 105 parts per million volume; and/or the self-supporting structure has a low thermal mass.

In yet another embodiment, a method of manufacturing a processing unit is described. The method may include: mixing an active material with a binder material, wherein the mixture has greater than 50% by weight of the active material and the remaining mixture includes binder material; forming a self-supporting structure from the mixture, wherein the self-supporting structure is a foam-geometry structure configured to provide one or more tortuous channels for fluid flow paths through the self-supporting structure; drying the self-supporting structure and disposing the self-supporting structure within housing of a processing unit having an interior region.

Moreover, in one or more embodiment, the method of manufacturing a processing unit may include various enhancements. For example, the method may include sintering the binder material and active material into a cohesive solid structure that is the self-supporting structure; wherein the sintering further comprises exposing the self-supporting structure to temperatures in the range between 400° C. and 800° C. and/or may include creating a plurality of valve ports into the housing; and securing a valve to the housing in each of the plurality of valve ports to form a plurality of valves, wherein each of the plurality of valves is configured to control fluid flow between the self-supporting structure and a location external to the housing.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
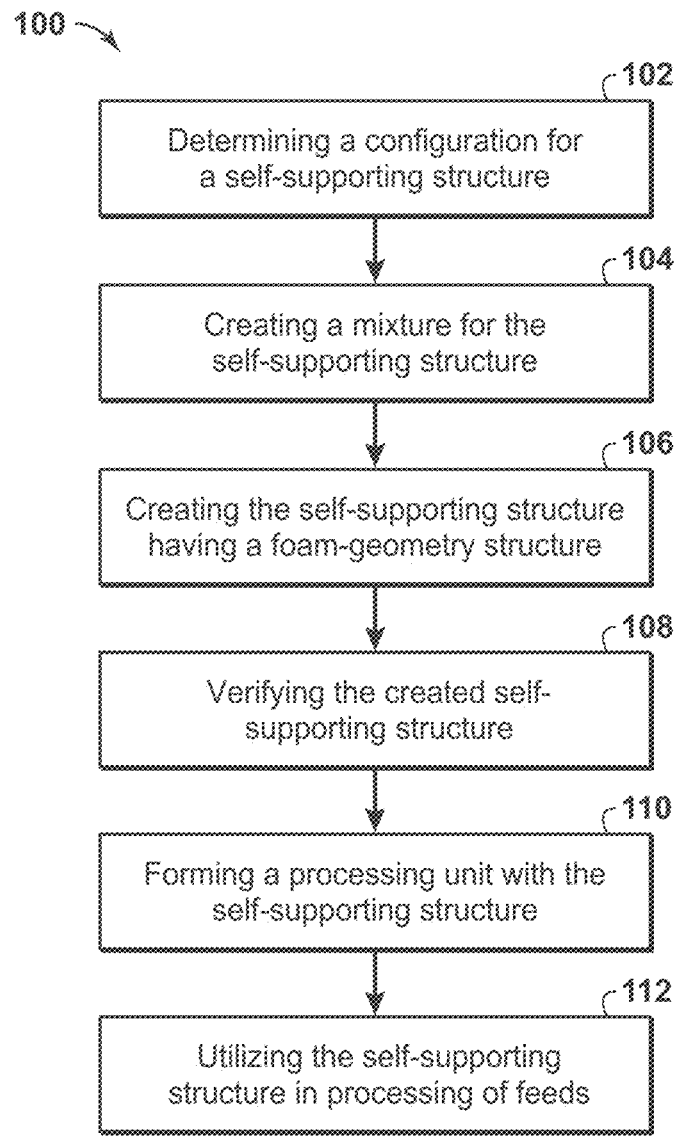
FIG. 1 is a flow diagram of a method for fabricating and using a self-supporting structure in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents to and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "majority component" means greater than 50% by weight.

As used herein, "foam-geometry" refers to structures having open channel networks, compared to extruded solid shapes, such as spheres or pellets. The foam-geometry structures include monoliths or other engineered structures that provide flow paths through tortuous channels or passages in the respective structure. The foam-geometry structures includes a network of interconnected voids surrounded by a web of struts.

As used herein, "stream" refers to a fluid (e.g., solids, liquid and/or gas) being conducted through various equipment. The equipment may include conduits, vessels, manifolds, units or other suitable devices.

As used herein, volume percent is based on standard conditions. The standard conditions for a method may be normalized to the temperature of 0° C. (Celsius) (e.g., 32° F. (Fahrenheit)) and absolute pressure of 100 kiloPascals (kPa) (1 bar).

The present techniques relate to the fabrication of self-supporting structures from active material, which may be foam-geometry structures that have tortuous flow paths. In particular, the present techniques relate to enhancements in the self-supporting structures that contain a majority of active material (e.g., greater than 50% by weight or greater than or equal to 60% by weight) to provide enhanced structures. The enhanced structures may provide flexibility through configurations, which may enhance the interaction of the stream with the active material through the tortuous flow paths and provide higher volumetric efficiency in the configurations, which are lighter in weight than conventional structures. The self-supporting structures may be configured to have various tortuous channels to provide fluid flow paths through the self-supporting structure.

The self-supporting structures may be useful in various chemical and engineering applications. By way of example, certain methods may be enhanced with the active materials, such as adsorption and catalytic processes. In particular, a self-supporting structure may be used instead of a packed adsorbent bed, which have higher pressure drops and slower mass transfer rates. In the packed bed configurations, the pressure drops and mass transfer limitations do not permit or are inefficient in operating the adsorption or catalytic processes at rapid cycles. Further, large volume gas separation processes, which rely upon pressure swing adsorption and rapid cycling, involve self-supporting structures with low pressure drop and high volumetric efficiency. The present techniques may provide enhancements to the associated structures to enhance the respective method and associated economics.

The self-supporting structure may be fabricated from various techniques, such as foam techniques. By way of example, the fabrication method may include a polymeric sponge method and a direct foaming method. The polymeric-sponge method produces open-cell structures by impregnating a polymeric sponge with a slurry, which is then burned out to leave a porous structure. The direct foaming method uses a mixture containing the desired component and organic materials, which on processing, causes foaming and evolves a gas. A resulting porous material is then dried and fired.

As an additional example, the present techniques may include providing a self-supported foam structure of a mixture having a foam-like geometry, wherein the self-supported structure includes a network of interconnected voids and struts, wherein the mixture has greater than 50% by weight of active material in the self-supporting structure and the remaining mixture includes binder material. The self-supporting structure may be a foam-geometry structure forming various tortuous paths through the respective structure. Once formed, the self-supporting structure may be dried and then be subjected to a calcining process. The calcining process may involve temperatures in the range between 400° C. and 800° C. to form a mechanically stable, active structure. The foam network of the self-supporting structure may provide higher external surface area and a tortuous path for gas flow compared to laminar flow extruded monoliths. Further, the pore density of the self-supported structure may be in the range between 10 pores per linear inch (ppi) and 100 ppi, in the range between 15 ppi and 60 ppi or in the range between 20 ppi and 40 ppi.

In other configurations, the self-supporting structure may include different layers or sheets of materials disposed adjacent to each other. The first sheets may have a first composition and a first pore density and the second sheets may have a second composition and second pore density. The first pore density is in the range from 1 pores per linear inch (ppi) to 20 ppi, in the range from 3 ppi to 17 ppi or in the range from 5 ppi to 15 ppi. The second pore density is in the range from 20 ppi to 100 ppi, in the range from 30 ppi to 70 ppi or in the range from 30 ppi to 60 ppi. Further, the first composition and the second composition may be different and the first composition may provide additional rigidity to the self-supporting structure. The first sheet may be configured to distribute the fluid stream from the respective first sheet into one of the second sheets. Further, the self-supporting structure may include additional layers or strips that is configured to distribute the fluid stream, such as diverting fluid flow into one or more of the first sheets.

The fabrication methods may utilize active materials, such as active inorganic materials, that are stable to high temperature calcinations (e.g., equal to or greater than 500° C.) and combination of organic and inorganic binders.

The present techniques may also include a foam method to produce bulk foam structures, which have the active material as the majority component. In contrast, conventional techniques involve applying a thin coating of active material to an inactive substrate, such as an inert ceramic or metal substrates. The inactive substrate, which typically provides mechanical support for the thin coating of active material, is more than 90% of the total weight of the self-supporting structure. Accordingly, the thin coating of active material in conventional self-supporting structures equal to or less than 10% of the total weight of the self-supporting structure.

In certain configurations, the self-supporting structure may include different combinations of active material and binder material. For example, the self-supporting structure may be fabricated from a microporous zeolites, which may be the active material. In certain configurations, the active material may be greater than or equal to 25% by weight of the self-supporting structure; greater than or equal to 40% by weight of the self-supporting structure; greater than or equal to 50% by weight of the self-supporting structure; greater than or equal to 60% by weight of the self-supporting structure; or greater than or equal to 70% by weight of the self-supporting structure; while the remaining portion may include binder material. In other configurations, the binder material may be less than 75% by weight of the self-supporting structure; less than 60% by weight of the self-supporting structure; less than 50% by weight of the self-supporting structure; less than 40% by weight of the self-supporting structure; or less than 30% by weight of the self-supporting structure; while the remaining portion may include active material.

The self-supporting structure may include higher masses of active material per unit volume that is greater than conventional coating techniques. For example, the layer or thickness of active material that is greater than 10 micrometers, is greater than 100 micrometers or is greater than 200 micrometers.

The active materials may include one or more adsorbent materials in certain configurations to adsorb contaminants from the stream. By way of example, the active materials may include zeolites, aluminophosphate molecular sieves (e.g., AlPOs and SAPOs), ZIFs (zeolitic imidazolate frameworks (e.g., ZIF-7, ZIF-9, ZIF-8, ZIF-11, etc.) and carbons, as well as mesoporous materials, such as the amine functionalized MCM materials (e.g., Mobil Composition of Matter or Mobil Crystillaine Material, such as MCM-22, MCM-41 or MCM-48), SBA materials, KIT materials and/or other suitable structures. Other example of active materials may include cationic zeolites, amine-functionalized mesoporous materials, stannosilicates, and/or carbons. In other configurations, the adsorbent materials may include zeolite type A (e.g., Linde type A (LTA) structures), such as 3A, 4A, 5A and/or 13X (which are highly porous adsorbents that have a high affinity and high capacity to adsorb water, as well as other molecules that have dimensions small enough to fit into the uniform pores of these structures), 8-member ring zeolite materials (e.g., ZSM 58 and/or DDR).

In other configurations, the active material may include one or more catalytic materials that are configured to react with the components in the stream.

The binder material may include organic and inorganic binder. The binder may include 1% aqueous solution of polyethylene oxide or methyl cellulose derivatives. For example, the binder material may include polyethylene oxide, and/or silicon dioxide ($SiO_2$). Silica particle diameter may be in the range between 25 nanometer and 1000 nanometer and silica particles in a string of pearls configuration.

As noted above, foam-geometry structures do not have parallel channels, such as the parallel channels in self-supported monolith structures. The foam-geometry structures have a network of interconnected voids and struts that result in a tortuous path flow, rather than laminar flow produced by parallel channel structures in monoliths. With the self-supporting structures, the external surface area per unit volume is directly associated to the mass transfer rate. The foam-geometry structures have a higher external surface area than monolith structures having defined channels and flow paths. The monoliths having defined channels and flow paths can only approximate the external surface area of foam-geometry structures if they have high cell density, such as, for example, in cell density of greater than 2000 cells per square inch. However, the high cell density reduces the voidage in a monolith substrate, which results in increased pressure drop and increased difficulty to coat the monolith substrate with active materials.

In the foam-geometry structures, the open cell ceramic foam structures include a network of interconnected voids surrounded by a web of ceramic struts, which is shown below in FIGS. 3A and 3B. The pore size of ceramic foams is defined as pores per linear inch (ppi). In contrast, a ceramic honeycomb with channels, the unit of measure is cells per square inch (cpsi). For ceramic foams, the pore sizes may range between 10 ppi and 100 ppi, 10 ppi and 80 ppi, 15 ppi and 60 ppi or 20 ppi and 40 ppi. For ceramic honeycombs used in monoliths, the cell densities generally range from 10 cpsi to 900 cpsi. The pressure drop through ceramic foam structures is between that of monoliths and packed beds.

The foam-geometry structures may be created by a polymeric sponge method and/or a direct foaming method. The polymeric-sponge method produces foam-geometry structures by impregnating a polymeric sponge with an active material slurry, which is then burned out to leave a porous material. The direct foaming method uses a mixture containing the desired active material component and organic materials, which on processing, causes foaming and evolves a gas. A resulting porous material is then dried and fired to form the self-supporting structure.

The foam-geometry structures may provide various enhancements over monolith configurations because the foam sheets are open cell structures in various directions, and the volume is small and there is no metal in the sheets. For PSA configurations, the gas streams may flow in one direction and the heat generated by the heat of adsorption may be captured and used to supplement an external heat source. Further, a heated purge stream may be used for a TSA process, with the purge stream flowing in perpendicular direction to the PSA flow.

By way of example, a processing unit may include a housing forming an interior region; a self-supporting structure disposed within the interior region, wherein the self-supporting structure has greater than 50% by weight of the active material in the self-supporting structure, wherein the self-supporting structure is a foam-geometry structure configured to provide one or more tortuous channels for fluid flow paths through the self-supporting structure; and a plurality of valves secured to the housing, wherein each of the plurality of valves is configured to control fluid flow along a flow path extending between the self-supporting structure and a location external to the housing. In various configurations, the processing unit may include two or more of the plurality of valves are operated via common actuation mechanism; the processing unit may be a cyclical swing adsorbent bed unit configured to remove contaminants from a gaseous feed stream that passes through the self-supporting structure; the self-supporting structure may have greater than 60% by weight of the active material in the self-supporting structure or the self-supporting structure may have greater than 70% by weight of the active material in the self-supporting structure; may include a flow distributor disposed between the adsorbent bed and the plurality of valves; the housing may be configured to maintain a pressure from 5 pounds per square inch absolute (psia) and 1,400 psia; wherein the self-supporting structure has pores in the range between 10 pores per inch and 100 pores per inch, pores in the range between 15 pores per inch and 60 pores per inch; or pores in the range between 20 pores per inch and 40 pores per inch and/or the self-supporting structure has a low thermal mass.

As yet another example, a method for removing contaminants from a feed stream may include: a) performing one or more adsorption steps in an adsorbent bed unit, wherein each of the one or more adsorption steps comprise: passing a gaseous feed stream through the self-supporting structure disposed in an interior region of a housing of the adsorbent bed unit to remove one or more contaminants from the gaseous feed stream, wherein the self-supporting structure has greater than 50% by weight of the active material in the self-supporting structure, wherein the self-supporting structure is a foam-geometry structure configured to provide one or more tortuous channels for fluid flow paths through the self-supporting structure; b) performing one or more regeneration steps, wherein each of the one or more regeneration steps comprise conducting away at least a portion of the one or more contaminants in a contaminant output stream; and c) repeating the steps a) to b) for at least one additional cycle. In certain configurations, the method may be a swing adsorption method and the cycle duration may be for a period greater than 1 second and less than 600 seconds or a period greater than 1 second and less than 300 seconds; wherein the performing one or more regeneration steps comprises performing one or more purge steps, wherein each of the one or more purge steps comprise passing a purge stream through the self-supporting structure to conduct away at least a portion of the one or more contaminants in the contaminant output stream; wherein the gaseous feed stream may be a hydrocarbon containing stream having greater than one volume percent hydrocarbons based on the total volume of the gaseous feed stream; wherein a feed pressure of the gaseous feed stream may be in the range between 400 pounds per square inch absolute (psia) and 1,400 psia; wherein performing the one or more adsorption steps may be configured to lower the carbon dioxide ($CO_2$) level to less than 50 parts per million volume; wherein performing the one or more adsorption steps may be configured to lower the water ($H_2O$) level to less than 105 parts per million volume; wherein the self-supporting structure has pores in the range between 10 pores per inch and 100 pores per inch; in the range between 15 pores per inch and 60 pores per inch or in the range between 20 pores per inch and 40 pores per inch and/or the self-supporting structure has a low thermal mass.

As yet another example, a method of manufacturing a processing unit may include: mixing an active material with a binder material, wherein the mixture has greater than 50% by weight of the active material and the remaining mixture includes binder material; forming a self-supporting structure from the mixture, wherein the self-supporting structure is a foam-geometry structure configured to provide one or more tortuous channels for fluid flow paths through the self-supporting structure; drying the self-supporting structure and/or disposing the self-supporting structure within housing of a processing unit having an interior region. Moreover, the method of manufacturing a processing unit may include various enhancements. For example, the method may include sintering the binder material and active material into a cohesive solid structure that is the self-supporting structure; wherein the sintering further comprises exposing the self-supporting structure to temperatures in the range between 400° C. and 800° C. and/or may include creating a plurality of valve ports into the housing; and securing a valve to the housing in each of the plurality of valve ports to form a plurality of valves, wherein each of the plurality of valves is configured to control fluid flow between the self-supporting structure and a location external to the housing.

Beneficially, the present techniques provide self-supporting structures that may be utilized to provide various enhancements over conventional approaches. For example, the present techniques may provide structures that provide tortuous channels or passages to promote interaction between the active material and the stream passing through the self-supporting structure. Further, by utilizing the active material to form the self-supporting structure, the working capacity may be increased and volumetric efficiency may be enhanced, which may further lessen the size of the structure and associated weight of the structure. The lessening of the size and weight may also lessen the associated size of the equipment utilized with the housing that contains the self-supporting structure. The present techniques may be further understood with reference to the FIGS. 1 to 6 below.

FIG. 1 is a flow diagram 100 of a method for fabricating and using a self-supporting structure in accordance with an embodiment of the present techniques. In this diagram 100, the method includes fabricating a self-supporting structure including active material along with using the self-supporting structure. In particular, the method may include determining a configuration for the self-supporting structure, as shown in block 102, creating a mixture for the self-supporting structure, as shown in block 104, creating the self-supporting structure as shown in blocks 106 and 108, and forming a processing unit with the self-supporting structure and utilizing the self-supporting structure in processing of feeds, as shown in blocks 110 and 112.

The method begins at block 102. In block 102, a configuration for a self-supporting structure is determined. This determination may involve modeling and identifying various aspects of the self-supporting structure to enhance process engineering selections, such as determining the mechanical features of the self-supporting structure, determining the cell size within the self-supporting structure, determining the pressure drop for flow through the self-supporting structure, determining the operating conditions that the self-supporting structure may be subject to during process operations (e.g., pressures, temperatures and stream compositions) and/or determining the contaminants to be adsorbed by the active material in the self-supporting structure.

Once the configuration for the self-supporting structure is determined, a mixture is created for the self-supporting structure, as shown in block 104. The mixture may include an active material with organic and/or inorganic binders to provide a specific formulation. The mixture, which may be an aqueous slurry. Once the mixture is created, the self-supporting structure is produced, as shown in blocks 106 and 108. At block 106, the self-supporting structure is created having a foam-geometry structure. The creation of the self-supporting structure may include provided the mixture to a container or vessel. The container or vessel may be used to perform foaming techniques on the mixture to form the struts and voids within the self-supporting structure. Then, the mixture may be processed to cure the mixture into a solid form. The processing may include heating the mixture to dry and/or cure the mixture. The method of producing active foam materials include a polymeric sponge method and a direct foaming method. The polymeric-sponge method produces open-cell structures by impregnating a polymeric sponge with an active material slurry, which is then burned out to leave a porous ceramic. The direct foaming method uses a mixture containing the desired ceramic component and organic materials, which on processing, causes foaming and evolves a gas. A resulting porous ceramic material is then dried and fired. At block 108, the created self-supporting structure may be verified. The verification of the created self-supporting structure may include using sensors to obtain measurements on the created self-supporting structure to identify voids, fractures and/or non-homogeneous sections of the created self-supporting structure. The verification may include performing a high temperature x-ray diffraction on the self-supporting structure. For example, a high temperature x-ray diffraction scan analysis may be used to determine maximum temperatures and time for calcination of the self-supporting structures.

Once the self-supporting structure is produced, the self-supporting structure is formed into a processing unit, as shown in block 110. The forming the processing unit, may involve disposing the self-supporting structure within a housing, coupling a head to the housing, coupling one or more valves (e.g., poppet valves) to the housing and coupling one or more conduits to the housing and/or one or more of the valves. The processing unit may be an adsorbent bed unit that includes a housing, which may include a head portion coupled to one or more body portions, that forms a substantially gas impermeable partition. The housing may include the self-supporting structure (e.g., formed as an adsorbent bed) disposed within an interior region enclosed by the housing. Various valves may be configured to provide fluid flow passages through openings in the housing between the interior region of the housing and locations external to the housing. Then, the self-supporting structure may be utilized in processing of fluids, as shown in block 112. For example, the processing of feeds may include performing swing adsorption method (e.g., rapid cycle processes) for the removal of one of more contaminants from a feed stream. Other examples may include utilizing the self-supporting structure in a catalytic process.

One method for forming the self-supporting structure may involve the use of foaming techniques. By way of example, the self-supporting structure may be prepared by such processes. As a result, the self-supporting structure may be a foam-geometry structure configured to provide tortuous channels for fluid flow paths through the structure.

Figure 2:
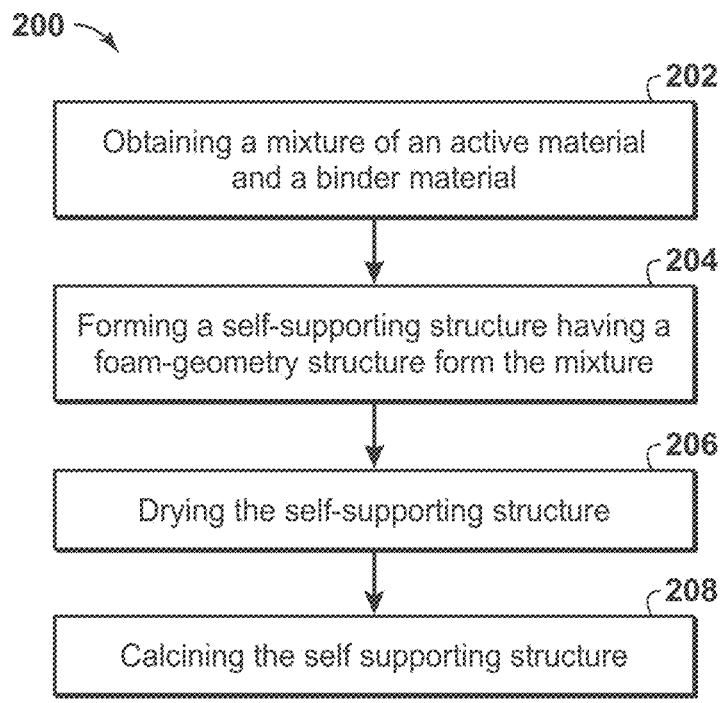
FIG. 2 is a flow diagram of a method for fabricating a self-supporting structure in accordance with an embodiment of the present techniques.

As example of the creation of the self-supporting structure is shown in FIG. 2. FIG. 2 is a flow diagram 200 of a method for fabricating a self-supporting structure in accordance with an embodiment of the present techniques. The method begins at block 202. In block 202, a mixture of an active material and a binder material is obtained. The mixture may include an active material with organic and/or inorganic binders to provide a specific formulation. Once the mixture is obtained, the self-supporting structure is formed, as shown in block 204. The formation of the self-supporting structure may include provided the mixture to a container or vessel. The container or vessel may be used to perform foaming techniques on the mixture to form the struts and voids within the self-supporting structure. Then, the mixture may be processed to cure the mixture into a solid form. At block 206, the created self-supporting structure may be dried. Then, the self-supporting structure may be subjected to a calcination process, as shown in block 208. The method may include sintering or calcining the binder material and active material into a cohesive solid structure that is the self-supporting structure. The calcining or sintering may include exposing the self-supporting structure to temperatures in the range between 400° C. and 800° C.

Beneficially, the self-supporting structure having a foam-geometry structure provide various enhancement. For example, the foam-geometry structure provide a higher geometric surface area per unit volume than other conventional monoliths. Further, in contrast to monoliths, the foam-geometry structure provides tortuous flow paths and have a higher mass transfer rate. While the pressure drop may be higher than conventional monoliths having substantially parallel channels, the foam-geometry structure have significantly lower pressure drop than packed bed configurations. In addition, the foam-geometry structure may be formed into rectangular sheet structures to permit modular unit designs. Various diagrams of the foam structure are shown in FIGS. 3A, 3B and 3C.

Figure 3A:
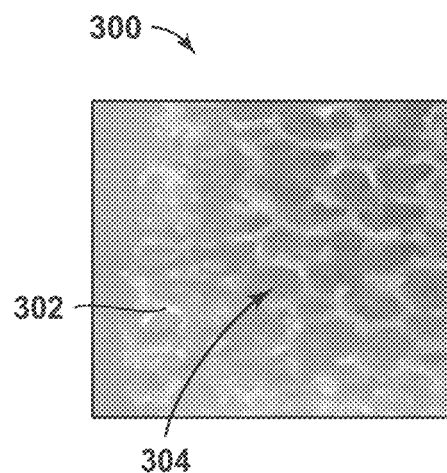
FIGS. 3A, 3B and 3C are diagrams associated with self-supporting structures in accordance with an embodiment of the present techniques.
Figure 3B:
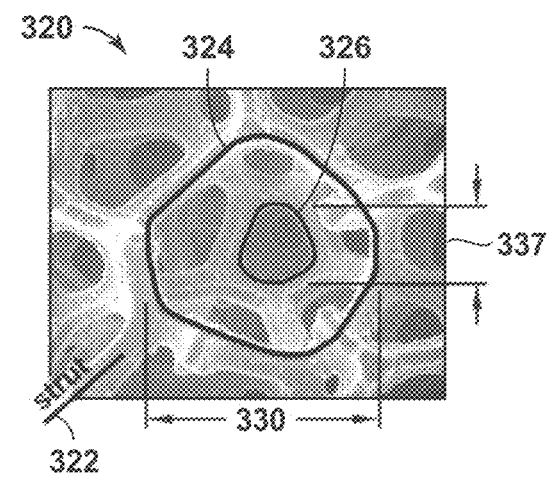
Figure 3C:
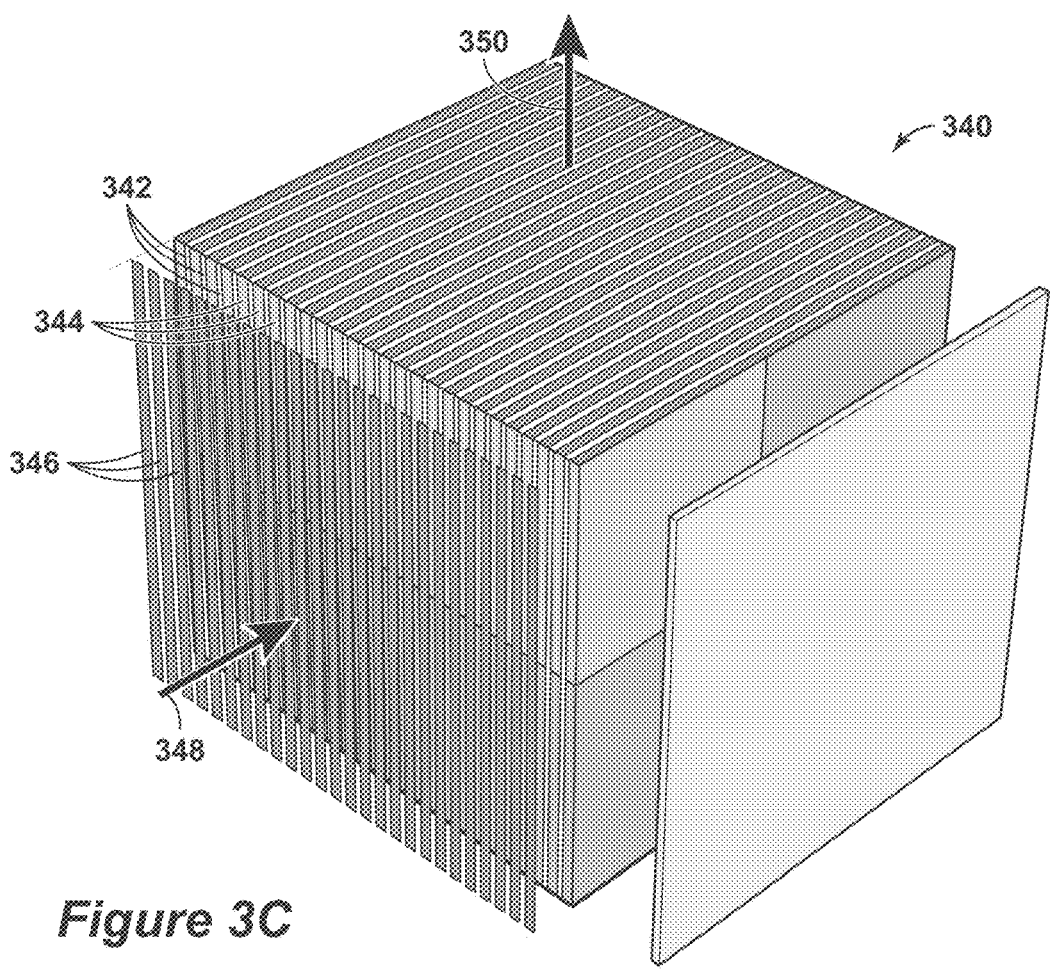

FIGS. 3A, 3B and 3C are diagrams 300, 320 and 340 associated with self-supporting structures in accordance with an embodiment of the present techniques. FIGS. 3A and 3B are examples of $Al_2O_3$ ceramic foams, as shown in diagrams 300 and 320. In FIG. 3A, the diagram 300 includes various struts 302 and pores 304. In FIG. 3B, the diagram 320 includes various struts, such as strut 322, which forms cells, such as cell 324, and pores, such as pore 326. The cell 324 has a width of 330, while the pore has a width 332. The foam-geometry structure provide enhanced mass transfer performance to laminar flow monolith structures, may be easier and cheaper to produce than extruded structures, and may provide flexibility in the adsorbent bed configurations. For example, foam sheet beds for rectangular modular design, and foams made of 70% by weight of active material can reduce bed volumes. The mixture used in the resulting self-supporting structures may include $3A/SiO_2$ having about a 70:30 ratio of active material by weight to binder by weight for the self-supporting structure (w/w).

To cure the mixture into the self-supporting structure, the thermal stability of active material by high temperature may be assessed. As noted above, one of the final steps in creating a self-supporting structure may include calcination. Calcination at high temperatures, which may include temperatures equal to or greater than 400° C. or even equal to or greater than 500° C., dehydrates the zeolite and $SiO_2$ particle mixture and coalesces the mixture into more dense structures that result in enhanced mechanical strength. To assess the high temperature stability of the active material (e.g., adsorbent or catalyst material) for calcination purposes, a high temperature x-ray diffraction may be performed on the self-supporting structure. For example, a high temperature x-ray diffraction scans may provide a representation to indicate that the 5A zeolite (e.g., active material) was stable at a specific temperature for a certain period of time (e.g., about 860° C. for several minutes) and then loses stability, which may be shown by decreasing peak heights. Accordingly, this type of analysis may be used to determine the maximum temperatures and time for calcination of the structures. The mechanical strength of the self-supporting structures is related to calcination temperatures greater than 500° C.

In certain configurations, the self-supporting structure may include different layers or sheets of materials intermixed and disposed adjacent to each other. The respective sheets may have different compositions and pore densities. For example, a first pore density may be in the range from 1 pores per linear inch (ppi) to 20 ppi, in the range from 3 ppi to 17 ppi or in the range from 5 ppi to 15 ppi. The second pore density may be in the range from 20 ppi to 100 ppi, in the range from 30 ppi to 70 ppi or in the range from 30 ppi to 60 ppi. In such configurations, one of the different sheets may provide additional rigidity to the self-supporting structure and may be configured to distribute the fluid stream from that respective sheet into one of the other sheets. Also, additional layers or strips may be used and may be configured to distribute the fluid stream, such as diverting fluid flow into one or more of the distribution sheets.

FIG. 3C is an example of a conceptual zeolite foam-geometry module of a self-supporting structure. This module may be utilized to process 1 million cubic feet (ft³) of CH₄ containing 2 weight percent (wt. %) H₂O. In FIG. 3C, the diagram 340 includes various the sheets, such as sheets 342, are 10 ppi Al₂O₃ structures. Each of these Al₂O₃ sheets may be 40 inches in width by 40 inches in length and 0.5 inches in depth. The Al₂O₃ sheets may be disposed between the 3A/SiO₂ foam sheets, such as sheets 344. These Al₂O₃ uncoated sheets may act as mechanical support and for diffusing gas into the 3A/SiO₂ foam sheets. The sheets 344 may be 65 ppi 3A/SiO₂ active material foam-geometry sheets. Each of the 3A/SiO₂ foam sheets may be 20 inches in width by 20 inches in length by 1 inch in depth. Further, the strips, such as strips 346, are stainless steel (SS) that block incoming flow from entering of the 3A/SiO₂ foam sheets. The strips 346 may be 40 inches in width by 1 inch in length and 0.04 inches in depth. Further, the arrows show flow direction for PSA flows, such as arrow 348, and TSA flows, such as arrow 350.

In this configuration, the active 3A/SiO₂ foam sheets may be stacked in a module and disposed between the Al₂O₃ foam sheets 342. The Al₂O₃ foam sheets have a pore density of 10 ppi, which has large pores for a low pressure drop. Incoming and outgoing gas flow may be parallel to 3A/SiO₂ foam sheet surfaces. For example, the incoming gas flow may be channeled through the uncoated Al₂O₃ foam sheets. The Al₂O₃ foam sheet provides rigidity to the structure and aids with incoming gas distribution. The uncoated Al₂O₃ foam sheets are only 50% as thick as the 3A/SiO₂ foam sheets. The effective gas flow path into the zeolite foam sheet is half the thickness. Laminates can be effective absorbents if excessive pressure drops are avoided. If the pressure drop perpendicular to the 3A/SiO₂ foam sheet is small, the foam may effectively perform as a laminar sheet with a large surface area.

In this configuration, various performance metrics may be calculated. For example, the pressure drop through 1 meter of an Al₂O₃ foam sheet may be calculated to be less than 18 Torr for a gas velocity of 5 meters per second (m/s). The pressure drop through 1 meter of Al₂O₃ foam sheet may be calculated to be approximately 1.5 pounds per square inch (psi) for a gas velocity of 5 m/s. Further, the open flow area of Al₂O₃ foam sheets for twenty nine sheets times the 0.5 inches times 40 inches is 580 inches squared (in³) (0.374 square meters (m²)).

In addition, the amount of zeolite material may also be calculated for the structure. For this calculation, the r is 1.7 gram per cubic centimeter (gm/cm³), for the 70 wt. % zeolite and 30 wt. % SiO₂ binder foam and 75% porosity are used. The volume of one sheet is 20 inches times 20 inches times 1 inch, which is 400 cubic inches (in³) (6,554.5 cubic centimeters (cm³)). The total mass of one sheet is 6,554.8 cm³ times 1.7 gm/cm³ times 0.25 (solid), which is 2,786 grams per sheet (gm/sheet). The total mass of 3A zeolite in one sheet is 2,786 gm/sheet times 0.7, which is 1,950 gm/sheet.

The amount of H₂O adsorption may also be calculated for the structure. In this calculation, a conservative estimate of 10 wt. % H₂O loading per sheet is 195 gm/sheet. For 2 wt. % H₂O in 1 million cubic feet of CH₄ is 412,782 gm. The number of sheets needed is 412,782 gm divided by 195 gm/sheet, which is 2,117 sheets. Each module has four sheets per layer times 28 layers, which is 112 sheets. As a result, the total modules needed is 2,117 sheets divided by 112 sheets/module, which is 18.9 modules.

Further, the estimated volume may also be calculated. The number of 3A/SiO₂ foam sheets needed for 19 modules is 19 modules times 112 sheets/module, which is 2,128 sheets. The module volume with 29 Al₂O₃ sheets and 28 3A/SiO₂ foam sheets is 42.5 inches times 40 inches times 40 inches, which is 68,000 cubic inches (in³) (1.114 m³). The total volume of 19 modules times 1.114 m³ is 21.166 m³. Then, in converting this to gallons, the amount is 21,166 liter is 5,591.5 gallons. Accordingly, the estimated volume (in gallons) of 19 module of the foam-geometry structure is 5,591 gallons.

The self-supporting structures, which may be foam-geometry active material monoliths, formed by the present techniques are made to be formed from 70% by weight of active material, calcined to much lower temperatures than ceramics (e.g., calcined to 400° C. to 800° C.). The lower temperatures are utilized to maintain activity of the zeolite. The strength for the resulting self-supporting structures is provided by the inorganic SiO₂ binder. However, the self-supporting structures, while mechanically stable, are not as strong as ceramic monoliths. While clay may be used as a binder for zeolites, it does not provide the strength of sintered SiO₂.

As a selection for the active material, the zeolite type A (e.g., LTA structures), such as 3A, 4A and/or 5A, are highly porous adsorbents that have a high affinity and high capacity to adsorb water, as well as other molecules that have dimensions small enough to fit into the uniform pores of these structures. Accordingly, processes that involve drying and purification of gases and liquids rely on the adsorption capacity and efficiency of LTA-type zeolites, such as swing adsorption methods. These 3A, 4A, 5A LTA-type zeolites have the ability to readily adsorb water over a wide range of conditions. They also release the adsorbed water when heated, without the zeolite structure degrading. Thus, they have the ability to cycle between releasing water when heated and readsorbing water upon cooling.

The use of 3A in water desorption is shown in relation to a thermogravimetric analysis (TGA). The TGA was performed by starting with a 3A zeolite powder without binder additives. The TGA experiment yields data on weight loss to the sample versus temperature, as shown in FIG. 4.

Figure 4:
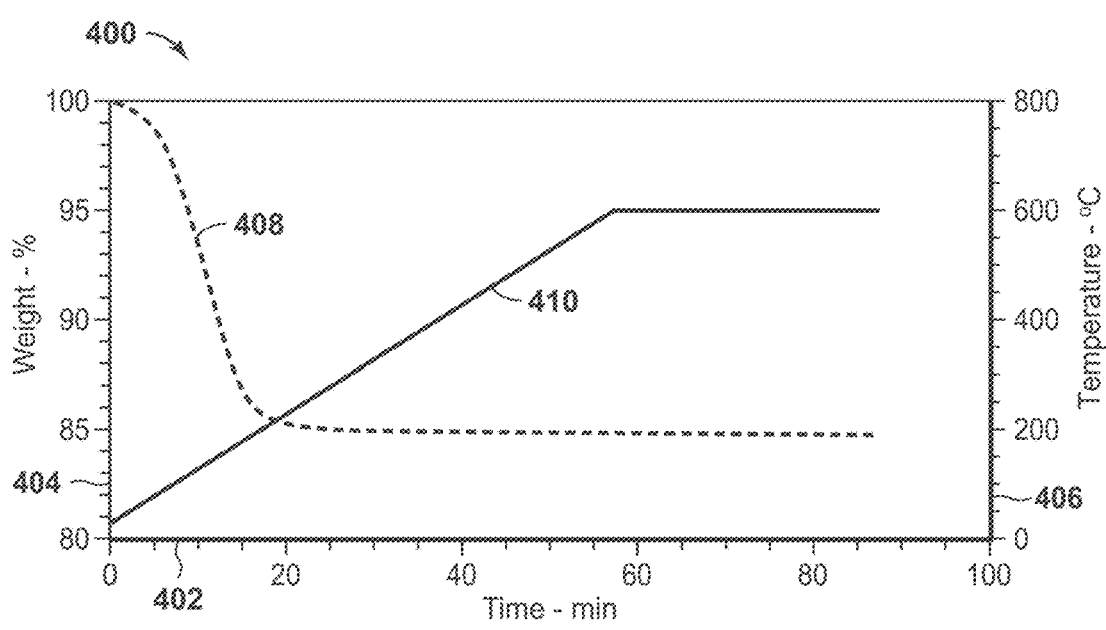
FIG. 4 is a diagram of the weight loss for 3A, due to loss of adsorbed water, as a function of temperature.

FIG. 4 is a diagram 400 of the weight loss for 3A, due to loss of adsorbed water, as a function of temperature. In this diagram 400, a first response 408 and a second response 410 are shown along a time axis 402 in minutes (min), a weight percentage axis 404 in percent and a temperature axis 406 in ° C. The sample was heated in air from 30° C. to 600° C., at a rate of 10° C. per minute, as shown along the second response 410. The first response 408 represents a total weight loss of 15.3%, indicating that the 3A powder had adsorbed 15.3% by weight of water at ambient conditions. The adsorbed water was removed from the sample at 280° C. (e.g., 25 minutes times 10° C./minute plus 30° C. starting temperature).

Further enhancements may be described by comparing H₂O desorption in 3A powder with H₂O adsorption in a 500° C. calcined 3A/SiO₂ intrusion structure, which is also expected to perform similar to the foam-geometry structure. As noted below, Table 1 compares the water adsorption in a calcined 3A/SiO₂ (e.g., 70:30 w/w) structure, to the water desorption results in response 408 of FIG. 4 on the 3A powder.

TABLE 1

| 3A/SiO$_2$ structure wt. after 500° C. (grams) | 3A wt. (%) in 3A/SiO$_2$ sturcture | 3A wt. calcd. (grams) | SiO2 wt calcd (grams) | Structure wt. after 3 days RT (grams) | Wt increase due to H$_2$O uptake (grams) | Wt. % increase in 3A/SiO$_2$ structure | 3A in structure (dry, 500° C.) + H$_2$O uptake (grams) | 3A wt. % increase due to H$_2$O uptake (%) | 3A powder TGA result (above) wt. loss due to H$_2$O desorption (%) | Agreement between TGA wt. loss and structure H$_2$O uptake (% of agreement) |
|---|---|---|---|---|---|---|---|---|---|---|
| 20.560 | 70% | 14.392 | 6.168 | 22.837 | 2.217 | 11.07% | 16.609 | 15.4% | 15.3% | 99.3% |

In Table 1, the 3A/SiO$_2$ structure is a 70:30 w/w 3A:SiO$_2$ laminar sheet. The structure was calcined to 500° C. to decompose organic binder and sinter the 3A and SiO$_2$ 25 nm particles together. The 3A/SiO$_2$ laminar sheet structure was stored in a 120° C. furnace, after 500° C. calcination process. The 3A component of the structure was expected to have no adsorbed water. The 3A/SiO$_2$ structure, which is 1 inch diameter by 2 inch length, was weighed at 120° C. from the furnace and its weight, as recorded in Table 1 was 20.560 grams, which has 70% of the 20.560 gram total weight, or 14.392 grams is the 3A component. The remaining 30% of the 20.560 grams of total weight, or 6.168 grams, is the 25 nm diameter SiO$_2$ binder particles.

After weighing the 3A/SiO$_2$ structure devoid of water (H$_2$O), the structure was exposed on a lab bench for seventy-two hours to ambient conditions. After seventy-two hours of being exposed to ambient conditions, the 3A/SiO$_2$ structure was re-weighed, and its weight was 22.837 grams. This increase in weight was 11.07%, which is a result of adsorbing 2.217 grams of water from the ambient air. The majority of the water could only be adsorbed by the 3A component in the 3A/SiO$_2$ structure. When determining the water uptake for the 3A component of the structure, it corresponds to a 15.4% weight increase. This weight increase is similar to the 15.3% weight loss in 3A powder, due to water desorption in response 408 of FIG. 4. As a result, the weight increase in the 3A/SiO$_2$ laminar sheet structure indicates that the 3A component in the structure is accessible to the water molecules.

For examples, the 3A component in the 3A/SiO$_2$ structure is porous. The windows or pores of the 3A structure have openings of 3 angstroms size. Water molecules have a diameter of about 2.8 angstroms and may fit into the 3A structure or adsorbed to the inside of the 3A structure. The SiO$_2$ binder is non-porous. The SiO$_2$ spheres do not have pores and thus, do not adsorb water into its structure. The water can wet the surface of the SiO$_2$ spheres, but that amount of water may be a very small fraction of the total amount of water that could be adsorbed by a 3A zeolite (70 wt %)/SiO$_2$ (30 wt %) structure. Thus, the 3A zeolite component is the primary material to adsorb water in the 3A/SiO$_2$ composite structure. TGA (thermal gravimetric analysis) measures weight loss versus temperature. FIG. 4 is the TGA analysis of 3A zeolite only. It shows that the 3A powder lost 15.3% of weight, which is due to desorbing the water that it adsorbed under ambient conditions.

From the example above, this TGA result on 3A zeolite powder is approximately equal to the 15.4% weight gain in the 3A/SiO$_2$ structure in the example due to adsorption of water under ambient conditions. The nearly identical TGA desorption (weight loss) result and adsorption (weight gain) result in the 3A/SiO$_2$ structure shows that the 3A zeolite component was accessible to the water. These results indicate that the SiO$_2$ binder does not block access to the 3A crystals. Accordingly, the 3A/SiO$_2$ structure does not hinder access to the 3A component.

As an additional enhancement, gas adsorption break-through tests were also performed on the self-supporting structures. A gas adsorption break-through unit, which is referred to as NatGas Unit, was used to measure gas adsorption and break-through profiles of coated substrates. A sample of known weight is wrapped to prevent gas bypass and inserted into a tube in the gas adsorption break-through unit. The samples are exposed to a total 1000 standard cubic centimeters per minute (sccm) gas flow rate, comprised of 300 sccm N$_2$ saturated with H$_2$O at 25° C., 100 sccm He and 600 sccm N$_2$. The gas break-through is monitored by a mass spectrometry. The gas flow measurement term of sccm represents cubic centimeters per minute (cm$^3$/min) at standard temperature and pressure.

As part of this testing, an aqueous slurry with 35 wt % solids, comprised of 3A/SiO$_2$ (70:30) and methyl cellulose (temporary organic binder), was formulated, as described above in the example 3A/SiO$_2$ slurry preparation. The slurry was applied to an Al$_2$O$_3$ ceramic monolith, which has dimensions suitable for testing in the gas adsorption break-through unit. The washcoat on the ceramic monolith had a similar composition to the self-supported structures after calcination. Thus, the 3A/SiO$_2$ washcoated monolith was used as a suitable surrogate for the self-supporting foam structures and, hence, breakthrough results should be and are expected to be comparable.

In this testing, the 900 cpsi Al$_2$O$_3$ monoliths had dimensions of 0.5 inch diameter by 1 inch length, 30% wall porosity and 55% open frontal area. The starting, uncoated weight of the monolith was 4.099 gram. Two coatings of the slurry were applied by conventional washcoating techniques and the sample was dried and calcined to 500° C. The sample weight after calcination was 4.893 grams. The resulting 3A/SiO$_2$ (25 nm diameter) washcoated monolith contained approximately 0.556 gram of 3A adsorbent and was a representative sample for formulations used in self-supporting foam-geometry structures. Prior to break-through testing, the 3A/SiO$_2$ coated monolith was dried for twelve hours at 150° C. and 100 sccm He flow.

Figure 5A:
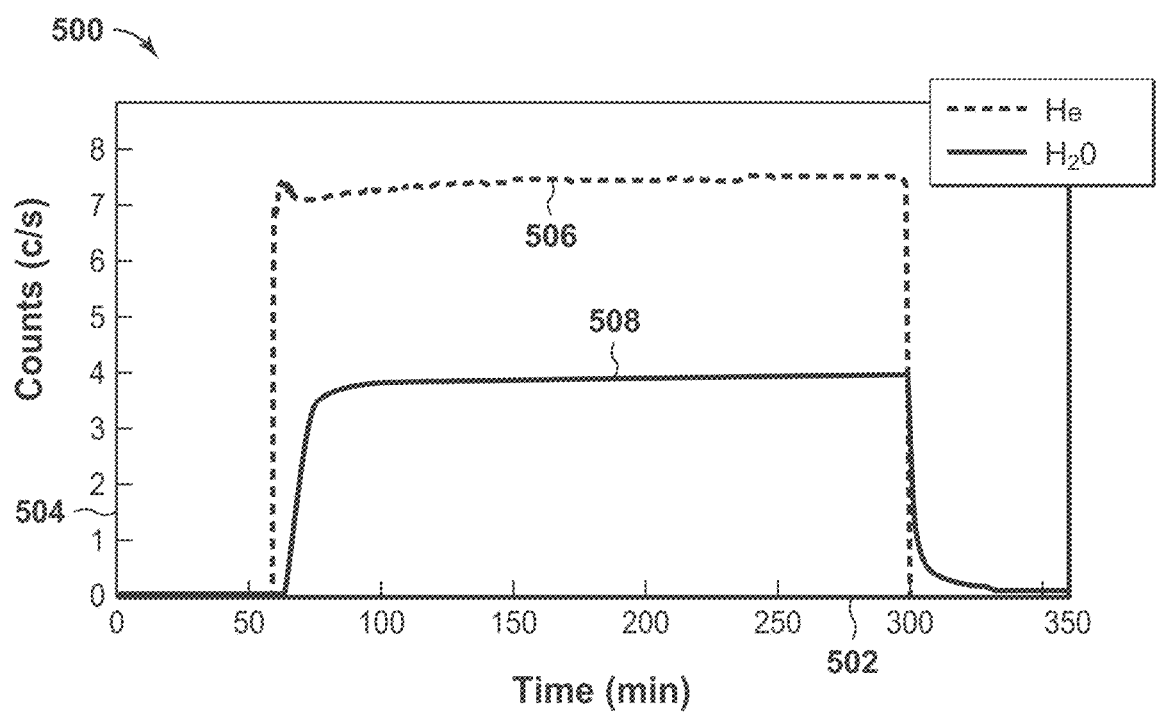
FIGS. 5A to 5D are diagrams of various profiles.
Figure 5B:
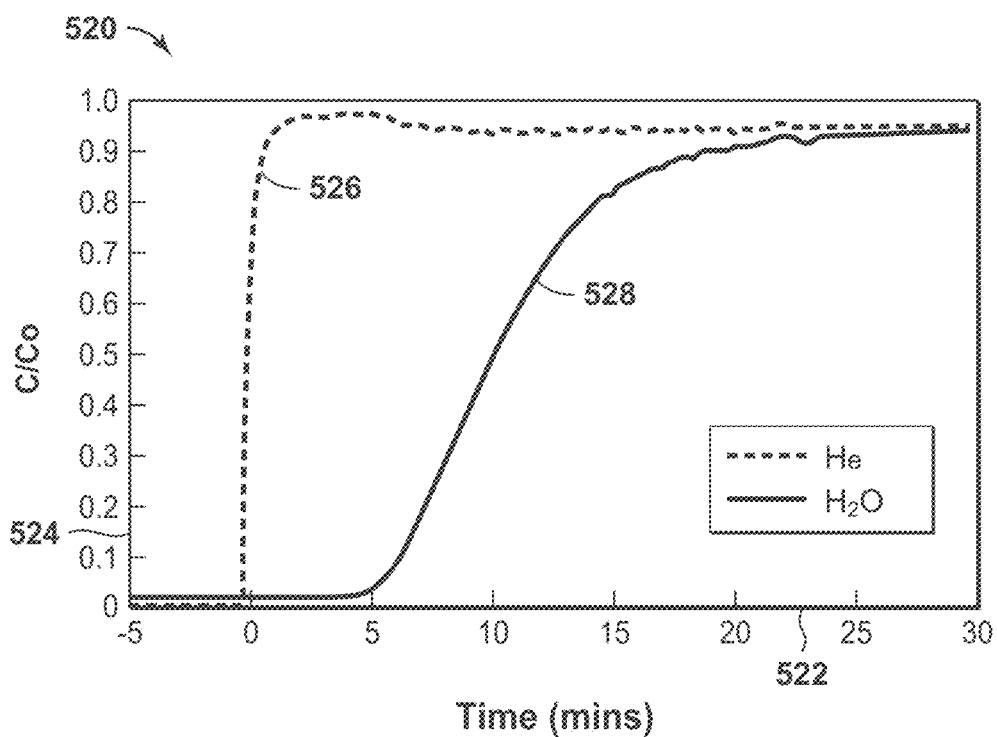

FIGS. 5A and 5B are diagrams 500 and 520 of breakthrough profiles. The breakthrough profile is reasonably sharp. In FIG. 5A, the He response 506 and H$_2$O response 508 are shown along a time axis 502 in minutes (mins) versus a mass spectrometer axis 504 in counts per second (c/s) to water. The estimated rate of water feed is 5.48 milligrams (mg) per minutes (min). The estimated time for 0.55 grams of 3A in the 3A/SiO$_2$ washcoat to adsorb water before break-through is 25 minutes (e.g., 30 minutes at uptake level off minus 5 minutes at beginning of uptake). The response 506 represents a blank trace (e.g., no sample), which from time 0 to 50 minutes of dry He purge and the response 506 is flat and near the baseline, indicating no counts for $H_2O$. Then, after 50 minutes, the valve switches to feed humidified He. The response 506 rises vertically as the mass spectrometer shows increasing counts per second of $H_2O$, until the $H_2O$ is removed at 300 minutes. Then, the response 506 returns to the baseline indicating no counts of $H_2O$. The response 508 shows a shows a similar experiment through a sample of $3A/SiO_2$ coated onto $Al_2O_3$ ceramic monolith. As indicated by this response 508, it is about 5 minutes longer for the response 508 to rise as compared to the response 506 for the blank sample, which indicates that $H_2O$ breakthrough is being slowed by the adsorption of $H_2O$ in the 3A component until the sample reaches water saturation and equilibrium.

In FIG. 5B, the He response 526 and $H_2O$ response 528 are shown along a time axis 522 in minutes versus a normalized fractional concentration of $H_2O$ axis 524 in normalized concentration (C/Co), which expresses the normalized fractional concentration of $H_2O$ being measured by a mass spectrometer as a function of time axis 522 in minutes (mins). In this diagram 520, the 3A adsorbs water for about 25 minutes, indicating that the 3A adsorbent particles are accessible without signs of major diffusional hindrance. The response 526 represents a dry He purge passing through an empty cell for 5 minutes, which is flat and near the baseline. Once a valve is switched to feed humidified He stream, the mass spectrometer indicates a breakthrough of the He at time 0 minutes. In comparison, the response 528 represents a sample cell with $3A/SiO_2$ washcoated ceramic monolith responding to a humidified He flow. The response 528 indicates the normalized $H_2O$ concentration versus time. Accordingly, it indicates that it takes several minutes (e.g., about 25 minutes) until the 3A component in the sample is saturated with $H_2O$ and the full concentration (100%) of $H_2O$ is indicated by the mass spectrometer.

Figure 5C:
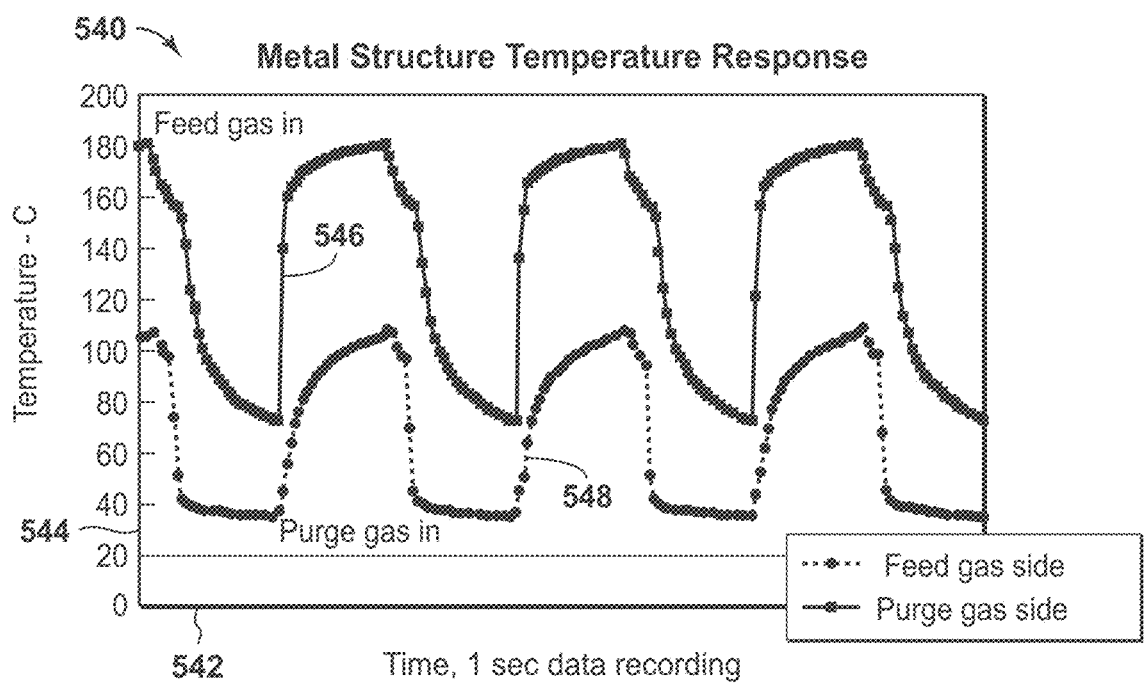
Figure 5D:
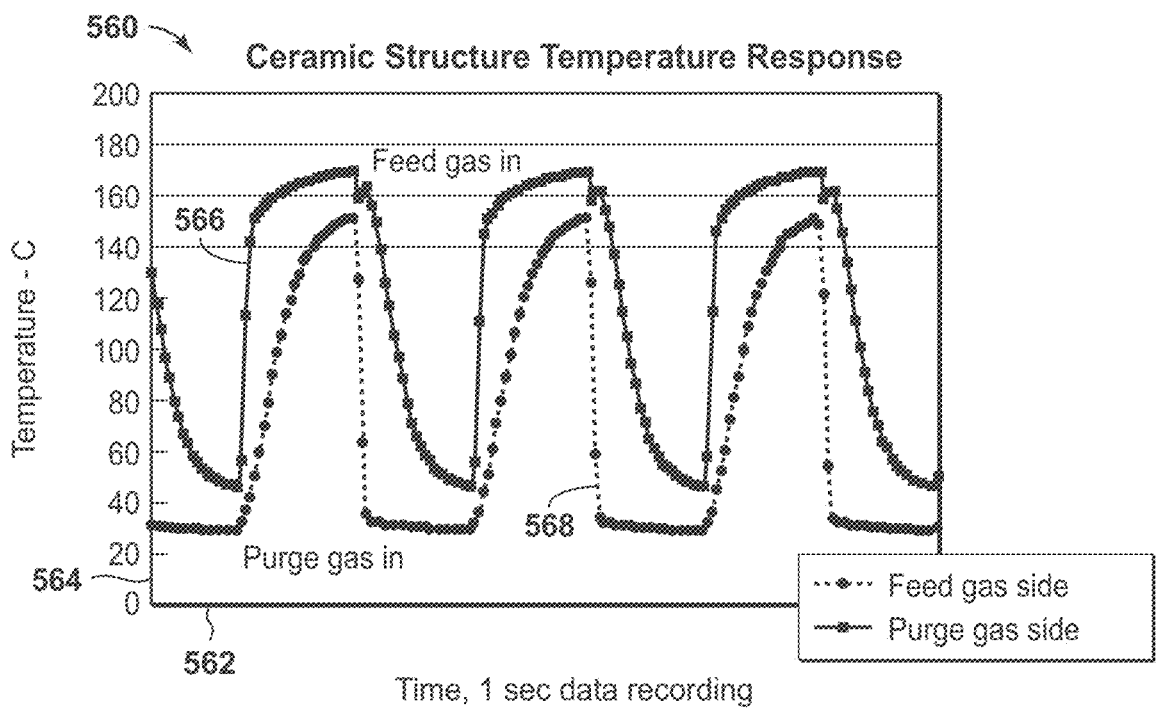

FIGS. 5C and 5D are diagrams 540 and 560 of transition feed versus purge temperature profiles. In this diagrams 540 and 560, ceramic monoliths perform than the metal monoliths. The ceramic materials should perform similar to the self-supported active structures, which have a low thermal mass structures similar to ceramics and should exhibit similar thermal swing advantages. Further, the self-supported structures of the present techniques are composed of a majority of active material, which is the material that the thermal swing.

In the diagrams 540 and 560, a cyclic process was used that involved fluid flows for 20 seconds each for feed and purge steps of the cycle. The gas flow rates were 14 standard cubic feed per minute (scfm) for feed gas and 22 scfm for purge gas. Nitrogen gas was used for feed and purge streams, which were introduced at opposite ends of the monoliths or adsorbent bed. The feed stream was at ambient temperature, while the purge stream was at 180° C. To monitor the temperature, fast response thermocouples were used to measure and store the temperatures, which had a first thermocouple positioned to measure temperatures at the feed gas inlet side of the structure and a second thermocouple positioned to measure temperatures at the purge gas inlet side of feed gas.

In FIG. 5C, the temperature responses 546 and 548 are shown along a time axis 542 in seconds (e.g., 1 second data recordings) versus a temperature axis 544 in ° C. The metal monolith used as a sample bed were three monoliths of 0.75 inches in diameter by 2 inches in length, made of stainless steel, with cell density greater than 1000 cell per square inch (cpsi), with 50 micron thick cell walls and a center steel arbor of ⅜ inch diameter. The monolith cells were coated with thin layer of adsorbent and the monoliths were wrapped with fibrous insulation to prevent gas bypass. The resulting structure was loaded into a sample tube. The diagram 540 with temperature responses 546 and 548 for the metal monoliths indicate a large temperature gap of approximately 70° C. in responding to temperature transitions between 180° C. purge gas and ambient temperature feed gas. This indicates that the metal monolith is adsorbing significant heat into the structure.

In FIG. 5D, the temperature responses 566 and 568 are shown along a time axis 562 in seconds versus a temperature axis 564 in ° C. The ceramic monolith used as a sample bed includes the monoliths of 0.75 inch diameter and 2 inch length, made of alumina ceramic, with cell density of 900 cpsi, with 100 micron thick cell walls, no center arbor. Ceramic monoliths were wrapped with fibrous insulation to prevent gas bypass. The resulting structure was loaded into a sample tube. The diagram 560 with the temperature responses 566 and 568 for the alumina ceramic monoliths indicate that the temperature transitions during the temperature cycle has a smaller temperature change than the metal monolith, as shown in FIG. 5C. The temperature gap in the responses 566 and 568 for the ceramic monoliths is approximately 20° C. during cycling process. This indicates that the ceramic monoliths adsorb less heat into the structure than the metal monoliths, as shown in FIG. 5C.

Testing may be performed on the self-supporting structure. For example, an ambient air exposure test may be performed, which is a passive test. There is no driving force to add water to the $3A/SiO_2$ structure. It slowly adsorbs water from the air and it is affected by conditions of relative humidity and temperature, which are measured. This test delivers a calibrated flow of gas in sccm with known concentration of water and monitors the time until the $3A/SiO_2$ structure has adsorbed water to its capacity. There is a mass spectrometer instrument monitoring the exit gas stream from the structure. The mass spectrometer instrument is monitoring water in the gas versus time. When water is detected, which is referred to as "breakthrough", it indicates that the 3A component of structures is saturated with water at these specific conditions and may not adsorb more water.

In certain configurations, the present techniques may be utilized in a swing adsorption method (e.g., a rapid cycle process) for the removal of one or more contaminants from a feed stream. In particular, the present techniques involve a one or more adsorbent bed units to perform a swing adsorption method or groups of adsorbent bed unit configured to perform a series of swing adsorption methods. Each adsorbent bed unit is configured to perform a specific cycle, which may include an adsorption step and a regeneration step. By way of example, the steps may include one or more feed steps, one or more depressurization steps, one or more purge steps, one or more recycle steps, and one or more re-pressurization steps. The adsorption step may involve passing a feed stream through the adsorbent bed to remove contaminants from the feed stream. The regeneration step may include one or more purge steps, one or more blow-down steps, one or more heating steps and/or one or more repressurization steps.

The present techniques may also include active materials that are configured to perform at various operating conditions. For example, the feed pressure may be based on the preferred adsorption feed pressure, which may be in the range from 400 pounds per square inch absolute (psia) to 1,400 psia, or in the range from 600 psia to 1,200 psia. Also, the purge pressure may be based on the sales pipeline pressure, which may be in the range from 400 psia to 1400 psia or in the range from 600 psia to 1200 psia.

Figure 6:
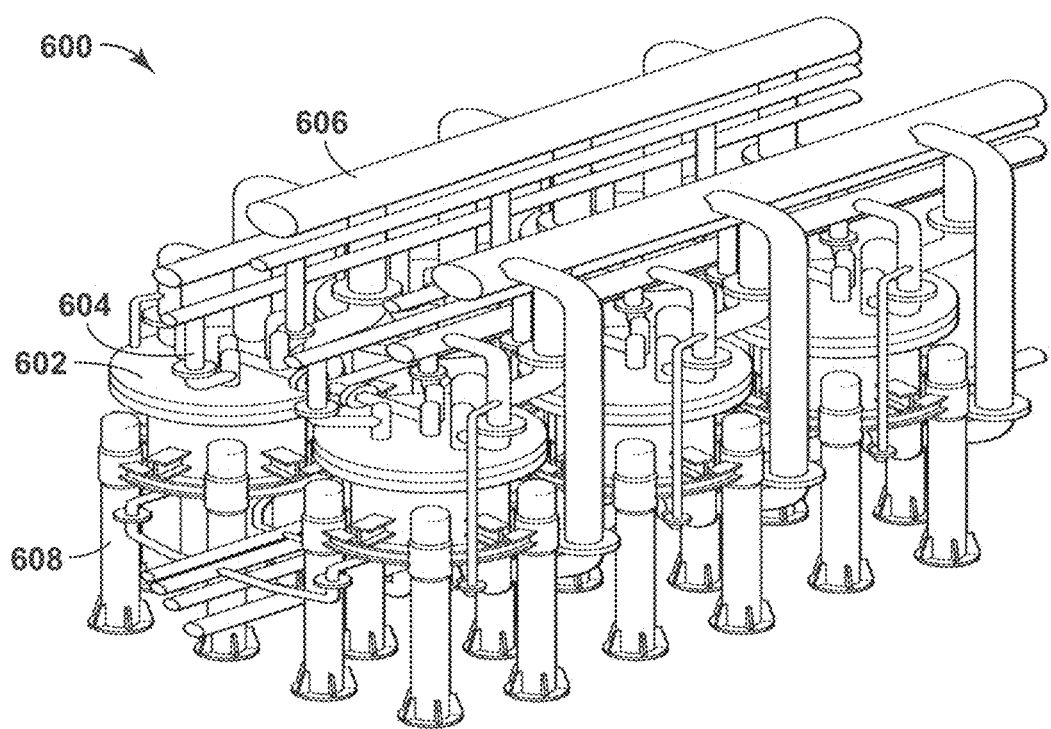
FIG. 6 is a three-dimensional diagram of the swing adsorption system with six adsorbent bed units and interconnecting piping in accordance with an embodiment of the present techniques.

By way of example, FIG. 6 is a three-dimensional diagram of the swing adsorption system 600 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units. In this configuration, the adsorbent bed units may include self-supporting structures.

In this system, the adsorbent bed units, such as adsorbent bed unit 602, may be configured for a cyclical swing adsorption method for removing contaminants from feed streams (e.g., fluids, gaseous or liquids). For example, the adsorbent bed unit 602 may include various conduits (e.g., conduit 604) for managing the flow of fluids through, to or from the adsorbent bed within the adsorbent bed unit 602. These conduits from the adsorbent bed units 602 may be coupled to a manifold (e.g., manifold 606) to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 608, which are dedicated to the adsorbent bed unit and may be dedicated to one or more step in the swing adsorption process.

In certain configurations, the self-supporting structure may be utilized in an adsorbent bed unit that includes a housing, which may include a head portion and other body portions, that forms a substantially gas impermeable partition. The housing may include the self-supporting structure (e.g., formed as an adsorbent bed) disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises adsorbent material formed into the self-supporting structure, which is capable of adsorbing one or more components from the feed stream. Such adsorbent materials are selected to be durable against the physical and chemical conditions within the adsorbent bed unit and can include metallic, ceramic, or other materials, depending on the adsorption process.

In certain configurations, the swing adsorption system, which includes the active material, may process a feed stream that predominately comprises hydrocarbons along with one or more contaminants. For example, the feed stream may be a hydrocarbon containing stream having greater than one volume percent hydrocarbons based on the total volume of the feed stream. Further, the feed stream may include hydrocarbons along with $H_2O$, $H_2S$, and $CO_2$. By way of example, the stream may include $H_2O$ as one of the one or more contaminants and the gaseous feed stream may comprise $H_2O$ in the range of 50 parts per million (ppm) molar to 1,500 ppm molar; or in the range of 500 ppm to 1,500 ppm molar. Moreover, the feed stream may include hydrocarbons and $H_2O$, wherein the $H_2O$ is one of the one or more contaminants and the feed stream comprises $H_2O$ in the range of two ppm molar to saturation levels in the feed stream.

In addition, the present techniques may provide an adsorption system that utilizes a rapid cycle swing adsorption method to separate acid gas contaminants from feed streams, such as acid gas from hydrocarbon streams. Acid gas removal technology may be useful for gas reserves exhibit higher concentrations of acid gas (e.g., sour gas resources). Hydrocarbon feed streams vary widely in amount of acid gas, such as from several parts per million acid gas to 90 volume percent (vol. %) acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$. Accordingly, the present techniques may include equipment to remove various contaminants, such as $H_2S$ and $CO_2$ to desired levels. In particular, the $H_2S$ may be lowered to levels less than 4 ppm, while the $CO_2$ may be lowered to levels less than 1.8 molar percent (%) or, preferably, less than 50 ppm. As a further example, the acid gas removal system may remove $CO_2$ to LNG specifications (e.g., less than or equal to 50 parts per million volume (ppmv) $CO_2$).

In certain configurations, the active material may be used in a rapid cycle swing adsorption method, such as a rapid cycle PSA process, to remove moisture from the feed stream. The specific level may be related to dew point of desired output product (e.g., the water content should be lower than the water content required to obtain a dew point below the lowest temperature of the stream in subsequent process and is related to the feed pressure). As a first approximation, and not accounting for fugacity corrections as a function of pressure, the water concentration in ppm that yields a certain dew point varies inversely with the pressure. For example, the output stream from the adsorbent bed may be configured to be the cryogenic processing feed stream, which satisfies the cryogenic processing specifications (e.g., approximately −150° F. (−101.1° C.) dew point for natural gas liquid (NGL) processes or approximately −60° F. (−51.1° C.) for Controlled Freeze Zone (CFZ) processes. The cryogenic processing feed stream specification may include a water content in the stream (e.g., output stream from the adsorbent bed or feed stream to the to be cryogenic processing) to be in the range between 0.0 ppm and 10 ppm, in the range between 0.0 ppm and 5.0 ppm, in the range between 0.0 ppm and 2.0 ppm, or in the range between 0.0 ppm and 1.0 ppm. The resulting output stream from the adsorbent beds during the purge step may include a water content in the stream to be in the range between 0.0 ppm and 7 pounds per standard cubic feet (lb/MSCF).

In one or more embodiments, the present techniques can be used for any type of swing adsorption method. Non-limiting swing adsorption methods for which the present techniques may include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these methods, such as pressure and/or temperature swing adsorption. Exemplary kinetic swing adsorption methods are described in U.S. Patent Application Publication Nos. 2008/0282892, 2008/0282887, 2008/0282886, 2008/0282885, 2008/0282884, 2014/0013955, 2017/0056810, 2017/0056813, 2017/0056814 and 2017/0056815, which are each herein incorporated by reference in their entirety. However, rapid cycle may be preferred to process the stream. However, the self-supporting structures may be preferably utilized with rapid cycle swing adsorption methods.

Further, in certain configurations of the system, the present techniques may include a specific process flow to remove contaminants, such as water ($H_2O$) or acid gas, in the swing adsoprtion system. For example, the method may include an adsorbent step and a regeneration step, which form the cycle. The adsorbent step may include passing a feed stream at a feed pressure and feed temperature through an adsorbent bed unit having an active material structure to separate one or more contaminants from the feed stream to form a product stream. The feed stream may be passed through the adsorbent bed in a forward direction (e.g., from the feed end of the adsorbent bed to the product end of the adsorbent bed). Then, the flow of the feed stream may be interrupted for a regeneration step. The regeneration step may include one or more depressurization steps, one or more purge steps and/or one or more re-pressurization steps. The depressurization steps may include reducing the pressure of the adsorbent bed unit by a predetermined amount for each successive depressurization step, which may be a single step and/or may be a blowdown step. The depressurization step may be provided in a forward direction or may preferably be provided in a countercurrent direction (e.g., from the product end of the adsorbent bed to the feed end of the adsorbent bed). The purge step may include passing a purge stream into the adsorbent bed unit, which may be a once through purge step and the purge stream may be provided in countercurrent flow relative to the feed stream. The purge product stream from the purge step may be conducted away and recycled to another system or in the system. Then, the one or more re-pressurization steps may be performed, wherein the pressure within the adsorbent bed unit is increased with each re-pressurization step by a predetermined amount with each successive re-pressurization step. Then, the cycle may be repeated for additional feed streams and/or the cycle may be adjusted to perform a different cycle for a second configuration. The cycle duration may be for a period greater than 1 second and less than 600 seconds, for a period greater than 2 second and less than 300 seconds, for a period greater than 2 second and less than 200 seconds, or for a period greater than 2 second and less than 90 seconds.

Also, the present techniques may be integrated into a various configurations, which may include a variety of compositions for the streams. Adsorptive separation methods, apparatus, and systems, as described above, are useful for development and production of hydrocarbons, such as gas and oil processing. Particularly, the provided methods, apparatus, and systems are useful for the rapid, large scale, efficient separation of a variety of target gases from gas mixtures. In particular, the methods, apparatus, and systems may be used to prepare feed products (e.g., natural gas products) by removing contaminants and heavy hydrocarbons (e.g., hydrocarbons having at least two carbon atoms). The provided methods, apparatus, and systems are useful for preparing gaseous feed streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery.

To provide fluid flow paths through the self-supporting structure in an adsorbent bed unit, valve assemblies may include poppet valves, which each may include a disk element connected to a stem element which can be positioned within a bushing or valve guide. The stem element may be connected to an actuating means, such as actuating means, which is configured to have the respective valve impart linear motion to the respective stem. As may be appreciated, the actuating means may be operated independently for different steps in the method to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets. Further, while this configuration has valve assemblies, the number and operation of the valves may vary (e.g., the number of valves) based on the specific cycle being performed.

In one or more embodiments, the rapid cycle swing adsorption method that utilize the self-supporting structures in the present techniques may include rapid cycle temperature swing adsorption (RCTSA) and/or rapid cycle pressure swing adsorption (RCPSA). For example, the total cycle times may be less than 600 seconds, less than 300 seconds, preferably less than 200 seconds, more preferably less than 90 seconds, and even more preferably less than 60 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A method for removing contaminants from a feed stream, the method comprising:
   a) performing one or more adsorption steps in an adsorbent bed unit, wherein each of the one or more adsorption steps comprise: passing a gaseous feed stream through the self-supporting structure disposed in an interior region of a housing of the adsorbent bed unit to remove one or more contaminants from the gaseous feed stream, wherein:
      the self-supporting structure has greater than 50% by weight of an active material in the self-supporting structure;
      the self-supporting structure is an foam-geometry structure configured to provide one or more tortuous channels for fluid flow paths through the self-supporting structure and wherein the active material is a catalyst or adsorbent material, and wherein the self-supporting structure comprises a plurality of first sheets having a first composition and a first pore density and a plurality of second sheets having a second composition and second pore density, wherein the first pore density is in the range from 1 pores per linear inch (ppi) to 20 ppi and the second pore density is in the range from 20 ppi to 100 ppi; and a plurality of valves are secured to the housing, wherein each of the plurality of valves is configured to control the flow of the gaseous feed stream along a flow path extending between the self-supporting structure and a location external to the housing;

b) performing one or more regeneration steps, wherein each of the one or more regeneration steps comprise conducting away at least a portion of the one or more contaminants in a contaminant output stream; and c) repeating the steps a) to b) for at least one additional cycle.

2. The method of claim 1, wherein the method is a swing adsorption method and the cycle duration is for a period greater than 1 second and less than 600 seconds.

3. The method of claim 1, wherein the cycle duration is for a period greater than 1 second and less than 300 seconds to separate one or more contaminants from the gaseous feed stream to form the product stream.

4. The method of claim 1, wherein the performing one or more regeneration steps comprises performing one or more purge steps, wherein each of the one or more purge steps comprise passing a purge stream through the self-supporting structure to conduct away at least a portion of the one or more contaminants in the contaminant output stream.

5. The method of claim 1, wherein the gaseous feed stream is a hydrocarbon containing stream having greater than one volume percent hydrocarbons based on the total volume of the gaseous feed stream.

6. The method of claim 1, wherein a feed pressure of the gaseous feed stream is in the range between 400 pounds per square inch absolute (psia) and 1,400 psia.

7. The method of claim 1, wherein performing the one or more adsorption steps is configured to lower the carbon dioxide ($CO_2$) level to less than 50 parts per million volume.

8. The method of claim 1, wherein performing the one or more adsorption steps is configured to lower the water ($H_2O$) level to less than 105 parts per million volume.

9. The method of claim 1, wherein the self-supporting structure has a low thermal mass.

10. The method of claim 1, wherein the self-supporting structure has pores in the range between 15 pores per inch and 60 pores per inch.

11. The method of claim 1, wherein the adsorbent bed unit operates as a cyclical swing process.

12. The method of claim 11, wherein the cyclical swing process is selected from a temperature swing adsorption (TSA) process, a pressure swing adsorption (PSA) process, a partial pressure purge swing adsorption (PPSA) process, a rapid cycle pressure swing adsorption (RCPSA) process, and a rapid cycle partial pressure swing adsorption (RCPPSA).

13. The method of claim 1, wherein the self-supporting structure has greater than 70% by weight of the active material in the self-supporting structure.

14. The method of claim 1, wherein the adsorbent bed unit further comprises a flow distributor disposed between the self-supporting structure and the plurality of valves.

* * * * *